US012619140B2

(12) United States Patent
Yasumatsu et al.

(10) Patent No.: US 12,619,140 B2
(45) Date of Patent: May 5, 2026

(54) LIGHT SOURCE APPARATUS AND PROJECTOR

(71) Applicant: SEIKO EPSON CORPORATION, Tokyo (JP)

(72) Inventors: Wataru Yasumatsu, Azumino (JP); Yuichiro Matsumoto, Azumino (JP); Naoya Shindo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 304 days.

(21) Appl. No.: 18/375,295

(22) Filed: Sep. 29, 2023

(65) Prior Publication Data

US 2024/0111209 A1 Apr. 4, 2024

(30) Foreign Application Priority Data

Sep. 30, 2022 (JP) ................................. 2022-157650

(51) Int. Cl.
        *G03B 33/12*        (2006.01)
        *G03B 21/20*        (2006.01)
(52) U.S. Cl.
        CPC ......... *G03B 33/12* (2013.01); *G03B 21/2013* (2013.01); *G03B 21/206* (2013.01); *G03B 21/2066* (2013.01)
(58) Field of Classification Search
        CPC . G03B 33/12; G03B 21/2013; G03B 21/2066
        USPC .......................................................... 353/31
        See application file for complete search history.

(56) References Cited

U.S. PATENT DOCUMENTS

| | | | |
|---|---|---|---|
| 2014/0285772 A1 | 9/2014 | Tajiri | |
| 2016/0353069 A1 | 12/2016 | Chikahisa | |
| 2018/0067389 A1 | 3/2018 | Kikuma et al. | |
| 2019/0391473 A1* | 12/2019 | Uchiyama .......... G03B 21/2073 | |
| 2020/0252589 A1 | 8/2020 | Akiyama | |

(Continued)

FOREIGN PATENT DOCUMENTS

| | | | | |
|---|---|---|---|---|
| CN | 110262172 A | * | 9/2019 | ............... G02F 1/13 |
| JP | 2006-227469 A | | 8/2006 | |
| JP | 2014-186115 A | | 10/2014 | |

(Continued)

OTHER PUBLICATIONS

Translation of CN 110262172 (Year: 2025).*
Translation of JP_2021179500_A (Year: 2025).*

*Primary Examiner* — Jerry L Brooks
(74) *Attorney, Agent, or Firm* — Oliff PLC

(57) ABSTRACT

A light source apparatus according to an aspect of the present disclosure includes a first light source section that outputs first light containing a first polarized component and a second polarized component, a second light source section that outputs second light, a wavelength converter that converts the first light into third light, a light combiner that combines the first light, the second light, and the third light, and a filter that attenuates light of the third wavelength band. The light combiner reflects the first polarized component and transmits the second polarized component to cause one of the first polarized component and the second polarized component to exit toward the wavelength converter, and transmits the first light and the second light or the third light and reflects the third light or the first light and the second light. The filter is movable.

12 Claims, 12 Drawing Sheets

(56)         References Cited

U.S. PATENT DOCUMENTS

2022/0121094 A1*    4/2022   Liu  ...................... G02B 27/141

FOREIGN PATENT DOCUMENTS

| JP | 2016-224304 | A |   | 12/2016 |
| JP | 2018-040935 | A |   | 3/2018 |
| JP | 2020-126089 | A |   | 8/2020 |
| JP | 2021179500 | A | * | 11/2021 |

* cited by examiner

FIG. 1

FIG. 3
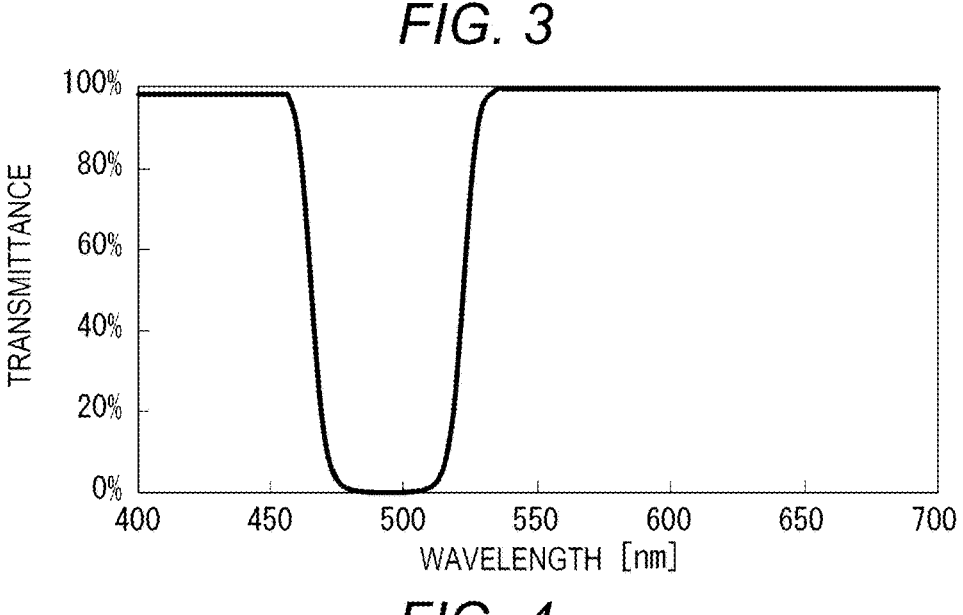
FIG. 4
FIG. 5
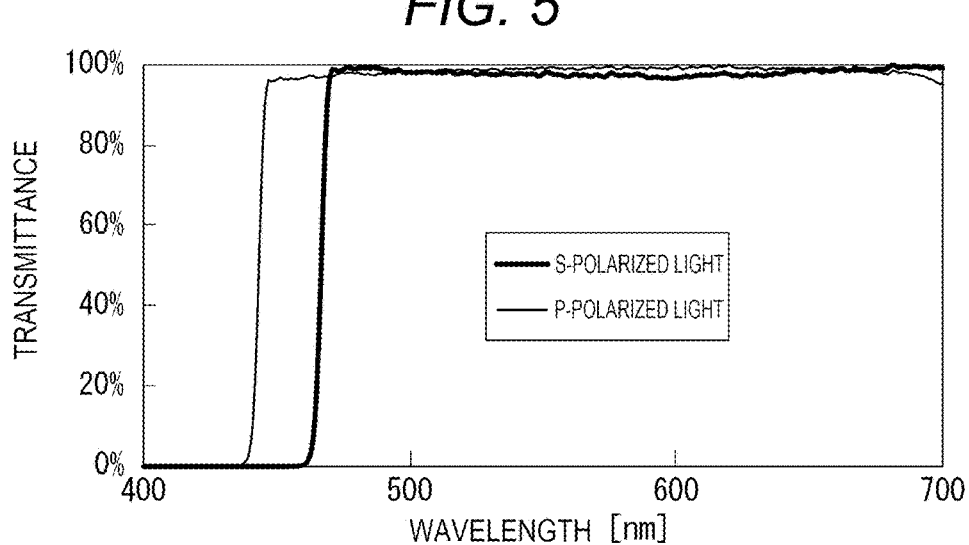

LIGHT SOURCE APPARATUS AND PROJECTOR

The present application is based on, and claims priority from JP Application Serial Number 2022-157650, filed Sep. 30, 2022, the disclosure of which is hereby incorporated by reference herein in its entirety.

BACKGROUND

1. Technical Field

The present disclosure relates to a light source apparatus and a projector.

2. Related Art

As a light source apparatus used in a projector, there has been a proposed light source apparatus using fluorescence emitted from a phosphor when the phosphor is irradiated with excitation light output from a light emitter. For example, JP-A-2014-186115 described below discloses a light source apparatus including a first light source that outputs blue light, a phosphor that is excited by the blue light to emit green light, a second light source that outputs red light, a first dichroic mirror that transmits the blue light and reflects the green light, and a second dichroic mirror that transmits the blue light and the green light and reflects the red light.

JP-A-2014-186115 is an example of the related art.

In recent projectors, there is a need in some cases for a function that allows a user to select a color-reproducibility-oriented mode or a luminance-oriented mode. To achieve such a projector, it is necessary to provide a light source apparatus that allows switching between the color-reproducibility-oriented mode and the luminance-oriented mode.

When a phosphor is used to generate specific color light, for example, green light, as in JP-A-2014-186115, a decrease in the purity of the green light is inevitable as compared with the purity achieved by a light source apparatus using a green laser. As a result, the color reproducibility deteriorates in a projector including a light source apparatus of this type. JP-A-2014-186115 describes that narrow-band filtering achieved by the second dichroic mirror allows effective use of red light, but the light source apparatus described in JP-A-2014-186115 has a problem of incapability of switching between the color-reproducibility-oriented mode and the luminance-oriented mode.

SUMMARY

To solve the problem described above, a light source apparatus according to an aspect of the present disclosure includes a first light source section that outputs first light that belongs to a first wavelength band containing a first polarized component and a second polarized component different from the first polarized component, a second light source section that outputs second light that belongs to a second wavelength band different from the first wavelength band, a wavelength converter that converts the first light into third light that belongs to a third wavelength band different from the first and second wavelength bands, a light combiner that combines the first light, the second light, and the third light with one another and outputs the combined light, and a filter that receives the third light and attenuates light that belongs to a wavelength band that is part of the third wavelength band. The light combiner reflects light formed of the first polarized component and transmits light formed of the second polarized component out of the first light output from the first light source section to cause one of the light formed of the first polarized component and the light formed of the second polarized component to exit toward the wavelength converter, and transmits the first light and the second light or the third light and reflects the third light or the first light and the second light. The filter is movable between a first position where the third light passes through the filter and a second position where the third light does not pass through filter.

A projector according to another aspect of the present disclosure includes the light source apparatus according to the aspect of the present disclosure, a light modulator that modulates light output from the light source apparatus and containing the combined light in accordance with image information, and a projection optical apparatus that projects the light modulated by the light modulator.

BRIEF DESCRIPTION OF THE DRAWINGS

FIG. 1 is a schematic configuration diagram of a projector according to a first embodiment.

FIG. 3 is a graph showing the spectral characteristics of a first optical film of a filter.

FIG. 4 is a graph showing the spectral characteristics of a second optical film of the filter.

FIG. 5 is a graph showing the spectral characteristics of a third optical film of a light combiner.

DESCRIPTION OF EMBODIMENTS

First Embodiment

Figure 2:
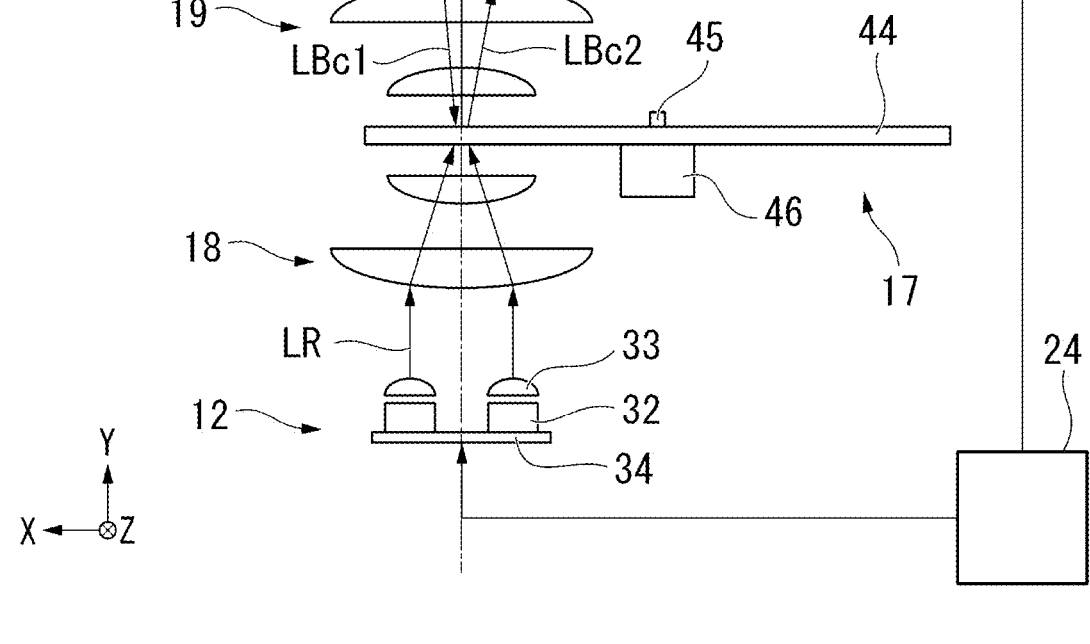
FIG. 2 is a schematic configuration diagram of a light source apparatus according to the first embodiment.

A first embodiment of the present disclosure will be described below with reference to FIGS. 1 to 11.

A projector according to the present embodiment is an example of a liquid crystal projector including a light source apparatus using a semiconductor laser and a phosphor.

In the following drawings, components may be drawn at different dimensional scales for clarification of each of the components.

A projector 10 according to the present embodiment is a projection-type image display apparatus that displays a color image on a screen (projection receiving surface) SCR. The projector 10 includes three light modulators corresponding to three types of color light, red light LR, green light LG, and blue light LB.

Figure 1:
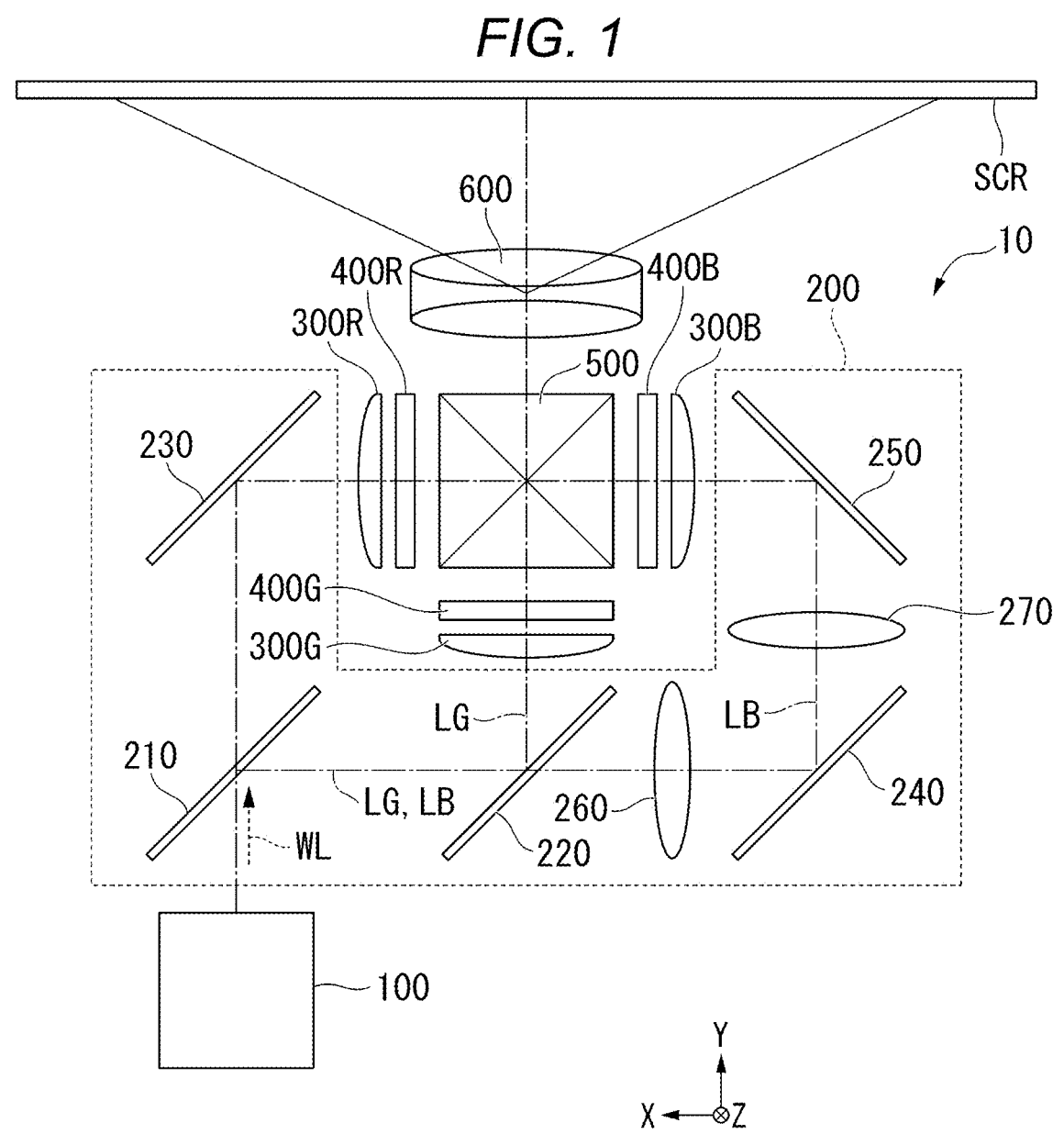

FIG. 1 is a schematic configuration diagram of the projector 10 according to the present embodiment.

The projector 10 includes a light source apparatus 100, a color separation and light guide system 200, a light modulator 400R for red light, a light modulator 400G for green light, a light modulator 400B for blue light, a cross dichroic prism 500, and a projection optical apparatus 600, as shown in FIG. 1.

In the present embodiment, the light source apparatus 100 outputs white combined light LW containing the red light LR, the green light LG, and the blue light LB. A specific configuration of the light source apparatus 100 will be described later.

The color separation and light guide system 200 includes dichroic mirrors 210 and 220, reflection mirrors 230, 240, and 250, and relay lenses 260 and 270. The color separation and light guide system 200 separates the combined light LW output from the light source apparatus 100 into the red light LR, the green light LG, and the blue light LB, guides the red light LR to the light modulator 400R for red light, guides the green light LG to the light modulator 400G for green light, and guides the blue light LB to the light modulator 400B for blue light.

A field lens 300R is disposed between the color separation and light guide system 200 and the light modulator 400R for red light. A field lens 300G is disposed between the color separation and light guide system 200 and the light modulator 400G for green light. A field lens 300B is disposed between the color separation and light guide system 200 and the light modulator 400B for blue light.

The dichroic mirror 210 transmits a red light component and reflects a green light component and a blue light component. The dichroic mirror 220 reflects the green light component and transmits the blue light component. The reflection mirror 230 reflects the red light component. The reflection mirrors 240 and 250 each reflect the blue light component.

The light modulator 400R for red light, the light modulator 400G for green light, and the light modulator 400B for blue light are each formed of a liquid crystal panel that forms an image by modulating color light incident thereon in accordance with image information.

Although not shown, a light-incident-side polarizer is disposed between each of the following two components: the field lens 300R and the light modulator 400R for red light; the field lens 300G and the light modulator 400G for green light; and the field lens 300B and the light modulator 400B for blue light. A light-exiting-side polarizer is disposed between each of the following two components: the light modulator 400R for red light and the cross dichroic prism 500; the light modulator 400G for green light and the cross dichroic prism 500; and the light modulator 400B for blue light and the cross dichroic prism 500.

The cross dichroic prism 500 combines the image light output from the modulator 400R for red light, the image light output from the modulator 400G for green light, and the image light output from the modulator 400B for blue light with one another to form a color image. The cross dichroic prism 500 is formed of four right-angled prisms bonded to each other and has a substantially square shape in a plan view. Dielectric multilayer films are provided at the substantially X-letter-shaped interfaces between the right-angled prisms bonded to each other.

The color image light having exited out of the cross dichroic prism 500 is enlarged and projected by the projection optical apparatus 600 on the projection receiving surface, such as the screen SCR. The projection optical apparatus 600 is formed of a plurality of lenses.

FIG. 2 is a schematic configuration diagram of the light source apparatus 100.

An XYZ orthogonal coordinate system is used as a coordinate system in the following description. The direction in which the combined light LW is output from the light source apparatus 100 is the direction toward the positive end of the axis Y, the direction in which the blue light is output from a first light source section 11, which will be described later, is the direction toward the positive end of the axis X, and the direction perpendicular to the axes X and Y and extending from the near side of the plane of view toward the far side thereof is the direction toward the positive end of the axis Z.

The light source apparatus 100 according to the present embodiment includes the first light source section 11, a second light source section 12, a wavelength converter 13, a light combiner 14, a filter 15, a parallelizer 16, a diffuser 17, a light collector 18, a light collection and pickup element 19, a second phase retarder 20, an optical integrator 21, a polarization converter 22, a superimposing lens 23, and a controller 24.

The first light source section 11 includes first light emitters 27, collimator lenses 28, and a first phase retarder 29. The first light emitters 27 are each formed of a blue semiconductor laser that emits linearly polarized blue light LBs. The first light emitters 27 each emit the blue light LBs, which belongs to a first wavelength band, toward the positive end of the direction X. The first wavelength band is, for example, a blue wavelength band of 455 nm±10 nm. The first light emitters 27 are mounted on a substrate 30. FIG. 2 shows two first light emitters 27, but the number of first light emitters 27 is not limited to a specific number. In the present embodiment, the blue light LBs emitted from the first light emitters 27 is S-polarized light with respect to the light combiner 14, and may instead be P-polarized light LBp with respect to the light combiner 14. In the following description, the terms S polarization and P polarization each represent the polarization direction with respect to the light combiner 14 unless otherwise noted.

The blue light LBs and the blue light LBp in the present embodiment correspond to the first light in the claims.

The collimator lenses 28 are provided at the light exiting side of the first light emitters 27. The collimator lenses 28 are each formed of a single convex lens provided in correspondence with each of the first light emitters 27. The collimator lenses 28 parallelize the blue light LBs emitted from the first light emitters 27.

The first phase retarder 29 is provided on the optical path of the blue light LBs between the first light emitters 27 and the light combiner 14. The first phase retarder 29 imparts a phase retardation to the blue light LBs. The first phase retarder 29 is formed of a half wave plate for the first wavelength band to which the blue light LBs belongs. The first phase retarder 29 is rotatable around an axis perpendicular to a light incident surface 29a (parallel to axis X). The first phase retarder 29 is therefore provided with a drive source such as a motor that is not shown.

Since the blue light LBs emitted from the first light emitters 27 is linearly polarized light (S-polarized component), appropriately setting the angle of rotation of the first phase retarder 29 allows the blue light LBs passing through the first phase retarder 29 to be converted into blue light containing the S-polarized component and the P-polarized component mixed with each other at a predetermined ratio. That is, rotating the first phase retarder 29 allows a change in the ratio between the S-polarized component and the P-polarized component. The first light source section 11 thus outputs the blue light LBs and the blue light LBp, which belong to the first wavelength band and contain the S-polarized component and the P-polarized component. The optical path of the chief rays of the blue light LBs and LBp output from the first light source section 11 is defined as an optical axis AX1 of the first light source section 11.

The first phase retarder 29 in the present embodiment corresponds to the first phase retarder in the claims. The S-polarized light component in the present embodiment corresponds to the first polarized component in the claims. The P-polarized light component in the present embodiment corresponds to the second polarized component in the claims.

The second light source section 12 includes second light emitters 32 and collimator lenses 33. The second light emitters 32 are each formed of a red semiconductor laser that emits linearly polarized red light LR. The second light emitters 32 emit the red light LR, which belongs to a second wavelength band, toward the positive end of the direction Y. The second wavelength band is, for example, a red wavelength band of 640 nm±10 nm. The second light emitters 32 are mounted on a substrate 34. FIG. 2 shows two second light emitters 32, but the number of second light emitters 32 is not limited to a specific number. The red light LR emitted from the second light emitters 32 may be either S-polarized light or P-polarized light. The optical path of the chief ray of the red light LR output from the second light source section 12 is defined as an optical axis AX2 of the second light source section 12.

The red light LR in the present embodiment corresponds to the second light in the claims.

The wavelength converter 13 includes a green phosphor that absorbs the blue light LBp, converts the blue light LBp into the green light LG, and emits the green light LG. That is, the wavelength converter 13 converts the blue light LBp output from the first light source section 11 into the green light LG, which belongs to a third wavelength band, and emits the green light LG toward the negative end of the direction X. The third wavelength band is, for example, a green wavelength band ranging from 470 to 650 nm. The wavelength converter 13 contains a phosphor material, as the green phosphor, for example, an $Lu_3Al_5O_{12}:Ce^{3+}$-based phosphor, a $Y_3O_4:Eu^{2+}$-based phosphor, a $(Ba,Sr)_2SiO_4:Eu^{2+}$-based phosphor, a $Ba_3Si_6O_{12}N_2:Eu^{2+}$-based phosphor, and an $(Si, Al)_6(O,N)_8:Eu^{2+}$-based phosphor. The wavelength converter 13 is provided on a substrate that is not shown. The wavelength converter 13 may be provided on a rotatable substrate in an annular shape around the axis of rotation. The configuration described above allows suppression of a rise in the temperature of the wavelength converter 13, an increase in the wavelength conversion efficiency, and an improvement in the reliability of the wavelength converter 13.

The green light LG in the present embodiment corresponds to the third light in the claims.

The light combiner 14 is provided at a position where the optical axis AX1 of the first light source section 11 and the optical axis AX2 of the second light source section 12 intersect with each other. The light combiner 14 includes a substrate 36, a third optical film 37 provided at one surface of the substrate 36, and a fourth optical film 38 provided at the other surface of the substrate 36. The third optical film 37 and the fourth optical film 38 are each formed of a dielectric multilayer film. The light combiner 14 inclines by 45 degrees with respect to the optical axes AX1 and AX2.

With the aid of the effects of the third optical film 37 and the fourth optical film 38, the light combiner 14, which receives the blue light LBs and LBp output from the first light source section 11, reflects the blue light LBs formed of the S-polarized component and transmits the blue light LBp formed of the P-polarized component to output the blue light LBp formed of the P-polarized component toward the wavelength converter 13 and output the blue light LBs formed of the S-polarized component toward the diffuser 17, transmits the blue light LBp and the red light LR, and reflects the green light LG. The light combiner 14 thus combines the blue light LBp incident from the diffuser 17 along the direction Y extending toward the positive end thereof, the red light LR incident from the second light source section 12 along the direction Y extending toward the positive end thereof, and the green light LG incident from the wavelength converter 13 along direction X extending toward the negative end thereof with one another, and outputs the combined white light LW toward the positive end of the direction Y. The spectral characteristics of the optical films 37 and 38 will be described later in detail.

The direction X extending toward the negative end thereof in the present embodiment corresponds to the first direction in the claims. The direction Y extending toward the positive end thereof in the present embodiment corresponds to the second direction in the claims.

The filter 15 is provided on the optical axis AX2 between the light combiner 14 and the optical integrator 21. In the present embodiment, the filter 15 is so oriented that a light incident surface 15a of the filter 15 intersects with the optical path of the chief ray of the combined light LW containing the green light LG at an angle of 90 degrees. The filter 15 includes a substrate 40, a first optical film 41 provided at one surface of the substrate 40, and a second optical film 42 provided at the other surface of the substrate 40. The first optical film 41 and the second optical film 42 are each formed of a dielectric multilayer film.

The filter 15 is movable in a direction (X-axis direction) perpendicular to the optical path of the chief ray of the combined light LW (optical axis AX2). That is, the filter 15 is movable between a first position (indicated by solid lines) at which the combined light LW containing the green light LG passes through the filter 15 and a second position (indicated by broken lines) at which the combined light LW containing the green light LG does not pass through the filter 15. The filter 15 may be configured to be automatically moved by a drive source such as a motor that is not shown when the user selects either one of the color reproducibility-oriented mode and the luminance-oriented mode, or may be configured to be manually moved by the user. When the filter 15 is located at the first position, where the combined light LW containing the green light LG is incident on the filter 15, the first optical film 41 and the second optical film 42 act to attenuate the green light LG, which belongs to part of the third wavelength band (green wavelength band). The spectral characteristics of the optical films 41 and 42 will be described later in detail.

The parallelizer 16 is provided on the optical axis AX1 between the wavelength converter 13 and the light combiner 14. In the present embodiment, the parallelizer 16 is formed of two convex lenses, but the number of lenses is not limited to a specific number. The parallelizer 16 parallelizes the green light LG that exits out of the wavelength converter 13 and causes the blue light LBp that exits out of the light combiner 14 to travel in the form of spot toward the wavelength converter 13.

The diffuser 17 is provided on the optical axis AX2 between the light combiner 14 and the second light source section 12. The diffuser 17 includes a diffusion plate 44 and a motor 46, which rotates the diffusion plate 44 around a rotary shaft 45. Although not shown, one surface of the diffusion plate 44 is provided with an uneven structure as a diffusion structure that diffuses blue light LBc1 and the red light LR to be incident on the diffusion plate 44. The uneven structure may have a configuration in which a plurality of recesses and protrusions having irregular shapes and sizes are formed, or a configuration in which a plurality of microlenses are arranged. The other surface of the diffusion plate 44 is provided with a dichroic film that is a reflection film that reflects the blue light component and transmits the red light component. The diffusion plate 44 may instead have a form of a frosted glass plate, a holographic diffuser, a blasted transparent substrate, or a transparent substrate in which scatterers are dispersed, or any other suitable form.

As described above, the light source apparatus 100 according to the present embodiment includes the diffuser 17, which diffuses the blue light LBc1 and the red light LR. The configuration described above allows homogenization of the illuminance distribution of the blue light LBc1 and the red light LR and reduction in color unevenness. Furthermore, since the blue light LBc1 and the red light LR, which are coherent light emitted from the semiconductor lasers, are diffused, speckle noise produced in an image when the light source apparatus 100 is incorporated in the projector 10 can be suppressed. Moreover, since it is not necessary to separately prepare a diffuser that diffuses the blue light LBc1 and a diffuser that diffuses the red light LR, the number of parts and the size of the light source apparatus 100 can be reduced. Furthermore, since the diffuser 17 is provided on the optical axis AX2 between the optical element 14 and the second light source section 12, an increase in the size of the light source apparatus 100 in a direction that intersects with the optical axis AX2 between the optical integrator 21 and the second light source section 12 can be suppressed.

The light collector 18 is provided on the optical axis AX2 between the second light source section 12 and the diffusion plate 44. In the present embodiment, the light collector 18 is formed of two convex lenses, but the number of lenses is not limited to a specific number. The light collector 18 collects the red light LR output from the second light source section 12 and directs the collected light toward the diffusion plate 44.

The light collection and pickup element 19 is provided on the optical axis AX2 between the diffusion plate 44 and the light combiner 14. In the present embodiment, the light collection and pickup element 19 is formed of two convex lenses, but the number of lenses is not limited to a specific number. The light collection and pickup element 19 collects the blue light LBc1 that exits out of the light combiner 14, directs the collected light toward the diffusion plate 44, and parallelizes the blue light LBc2 and the red light LR diffused by the diffusion plate 44.

The second phase retarder 20 is provided on the optical axis AX2 between the light collection and pickup element 19 and the light combiner 14. The second phase retarder 20 imparts a phase retardation to the blue light LBs and LBc2. The second phase retarder 20 is formed of a quarter wave plate for the first wavelength band to which the blue light LBs and the blue light LBc2 belong. As a result, the linearly polarized blue light LBs passing through the second phase retarder 20 is converted into circularly polarized blue light LBc1, and the circularly polarized blue light LBc2 passing through the second phase retarder 20 is converted into the linearly polarized blue light LBp.

The optical integrator 21 includes a first multi-lens array 48 and a second multi-lens array 49. The first multi-lens array 48 includes a plurality of first lenses that divide the combined light LW into a plurality of luminous fluxes.

The lens surface of the first multi-lens array 48, that is, the surfaces of the first lenses are conjugate with an image formation region of each of the color light modulators 400R, 400G, and 400B. Therefore, when viewed in the direction of the optical axis AX2, the first lenses each have a rectangular shape substantially similar to the shape of the image formation region of each of the light modulators 400R, 400G, and 400B. The plurality of luminous fluxes having exited out of the first multi-lens array 48 are thus each efficiently incident on the image formation region of each of the light modulators 400R, 400G, and 400B.

The second multi-lens array 49 includes a plurality of second lenses corresponding to the plurality of first lenses of the first multi-lens array 48. The second multi-lens array 49 along with the superimposing lens 23 brings images of the first lenses of the first multi-lens array 48 into focus in the vicinity of the image formation region of each of the light modulators 400R, 400G, and 400B.

The combined light LW having passed through the optical integrator 21 enters the polarization converter 22. The polarization converter 22 has a configuration in which polarization separation films, reflection films, and retardation films that are not shown are arranged in an array. The polarization converter 22 aligns the polarization directions of the combined light LW with a predetermined direction. Specifically, the polarization converter 22 aligns the polarization directions of the combined light LW with the direction of the transmission axis of the light-incident-side polarizers for the light modulators 400R, 400G, and 400B.

The polarization directions of the red light LR, the green light LG, and the blue light LB separated from the combined light LW having passed through the polarization converter 22 thus coincide with the transmission axis directions of the light-incident-side polarizers for the light modulators 400R, 400G, and 400B. The red light LR, the green light LG, and the blue light LB are therefore incident on the image formation regions of the light modulators 400R, 400G, and 400B, respectively, without being absorbed by the light-incident-side polarizers.

The combined light LW having passed through the polarization converter 22 enters the superimposing lens 23. The superimposing lens 23, in cooperation with the optical integrator 21, homogenizes the illuminance distribution in the image formation region of each of the light modulators 400R, 400G, and 400B, which are illumination receiving regions.

The controller 24 controls the values of current to be supplied to the first light emitters 27 of the first light source section 11 and the second light emitters 32 of the second light source section 12. Specifically, the controller 24 separately controls the value of the current to be supplied to each of the first light source section 11 and the second light source section 12 with the filter 15 placed at the first position, and the value of the current to be supplied to each of the first light source section 11 and the second light source section 12 with the filter 15 placed at the second position. A specific example of the control will be described later. The controller 24 may further control the movement of the filter 15, the angle of rotation of the first phase retarder 29, the rotary speed of the diffusion plate 44, and other factors when either one of the color-reproducibility-oriented mode and the luminance-oriented mode is selected.

The behavior of the light output from each of the first light source section 11 and the second light source section 12 will be described below.

As described above, in the first light source section 11, the blue light LBs formed of the S-polarized component and emitted from the first light emitters 27 passes through the first phase retarder 29, which converts the blue light LBs into the blue light LBs and LBp formed of the S-polarized component and the P-polarized component mixed at a predetermined ratio. Out of the resultant blue light, the blue light LBp formed of the P-polarized component passes through the light combiner 14, is collected by the parallelizer 16, and enters the wavelength converter 13. In the wavelength converter 13, the green phosphor is excited by the blue light LBp and emits the green light LG. The green light LG emitted from the wavelength converter 13 is parallelized by the parallelizer 16, is then reflected off the light combiner 14, and travels toward the filter 15.

On the other hand, the blue light LBs formed of the S-polarized component is reflected off the light combiner 14, and passes through the second phase retarder 20, which converts the blue light LBs into predetermined circularly polarized light, for example, the right-handed circularly polarized blue light LBc1. The right-handed circularly polarized blue light LBc1 is collected by the light collection and pickup element 19 and enters the diffusion plate 44. The right-handed circularly polarized blue light LBc1 incident on the diffusion plate 44 is diffused and converted into the left-handed circularly polarized blue light LBc2 by the diffusion plate 44. The left-handed circularly polarized blue light LBc2 is parallelized by the light collection and pickup element 19, and then passes through the second phase retarder 20, which converts the blue light LBc2 into the blue light LBp formed of the P-polarized component. The blue light LBp formed of the P-polarized component passes through the light combiner 14 and travels toward the filter 15.

In the second light source section 12, the red light LR emitted from the second light emitters 32 is collected by the light collector 18 and incident on the diffusion plate 44, which diffuses the collected red light LR. The diffused red light LR is parallelized by the light collection and pickup element 19, passes through the second phase retarder 20, passes through the light combiner 14, and travels toward the filter 15. Since the second phase retarder 20 is optimized for the blue wavelength band, the polarization state of the red light LR does not change significantly even after the red light LR passes through the second phase retarder 20. The light combiner 14 transmits the red light LR regardless of the polarization state of the red light LR.

As described above, the blue light LBp, the green light LG, and the red light LR are combined with one another by the light combiner 14. The white combined light LW exits out of the light combiner 14.

The spectral characteristics of each of the optical films of the filter 15 and the light combiner 14 will be described below.

Figure 6:
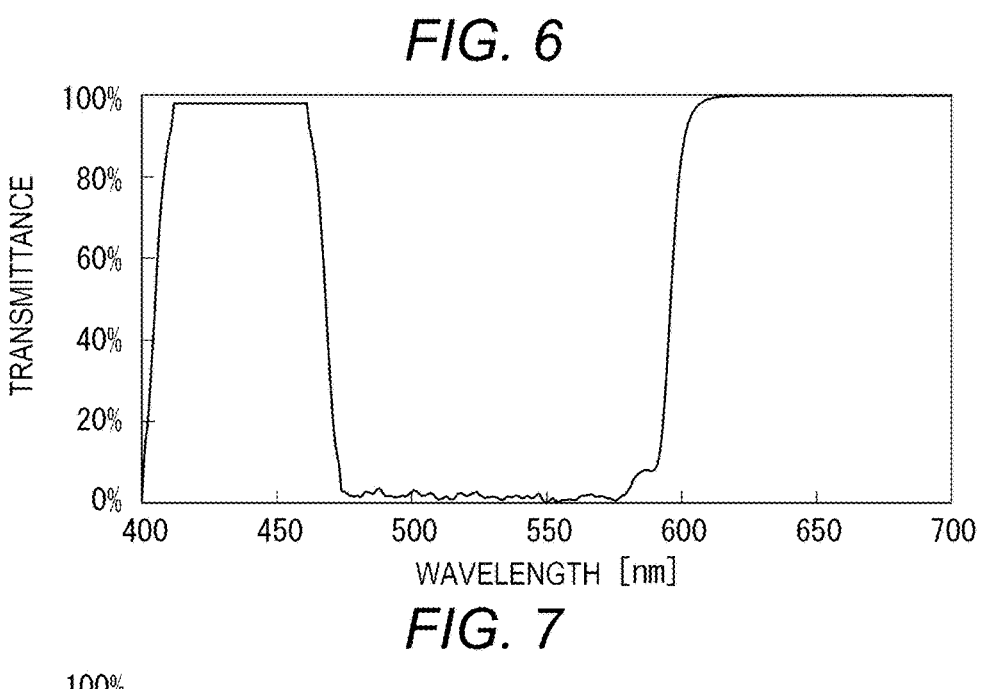
FIG. 6 is a graph showing the spectral characteristics of a fourth optical film of the light combiner.

FIG. 3 is a graph showing the spectral characteristics of the first optical film 41 of the filter 15. FIG. 4 is a graph showing the spectral characteristics of the second optical film 42 of the filter 15. FIG. 5 is a graph showing the spectral characteristics of the third optical film 37 of the light combiner 14. FIG. 6 is a graph showing the spectral characteristics of the fourth optical film 38 of the light combiner 14. In FIGS. 3 to 6, the horizontal axis represents the wavelength (nm), and the vertical axis represents the transmittance (%).

Figure 8:
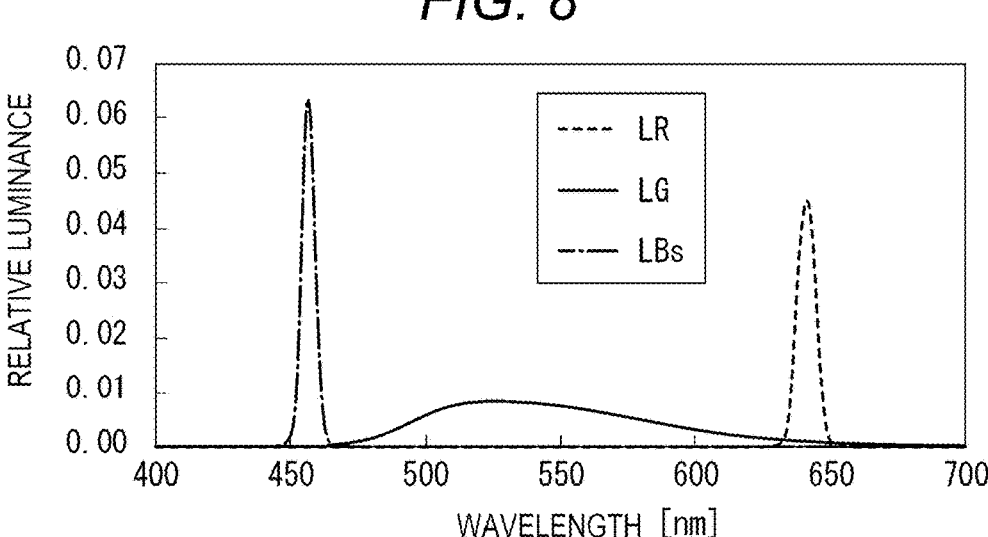
FIG. 8 is a graph showing the spectrum of the light emitted from each light source section.
Figure 9:
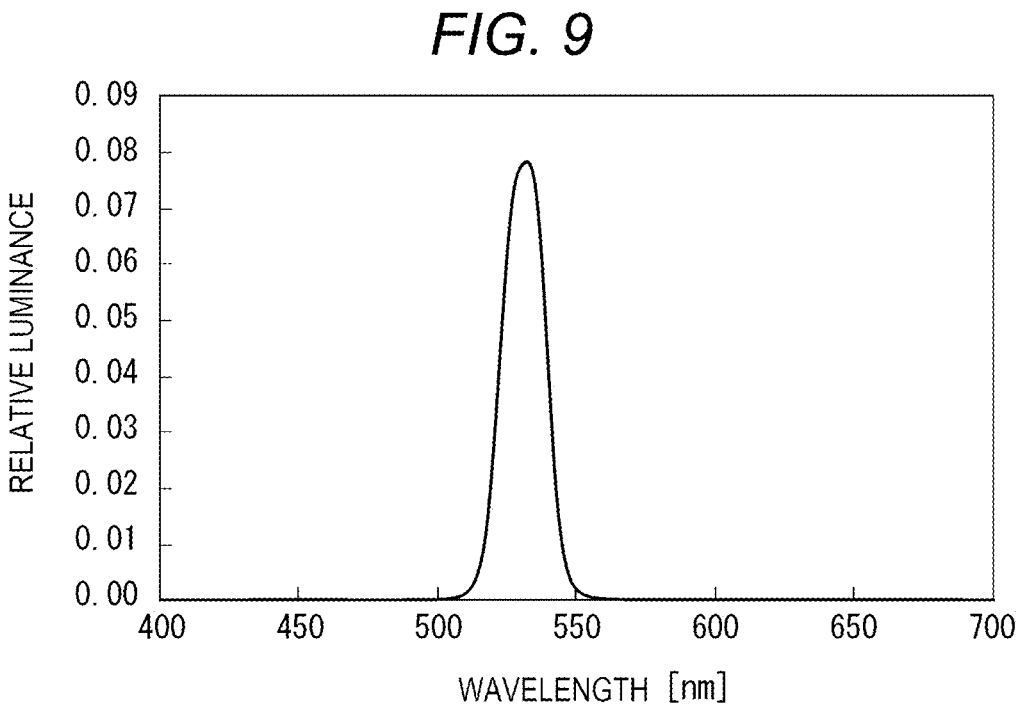
FIG. 9 is a graph showing the spectrum of green light after passing through the filter.

FIG. 8 is a graph showing the spectrum of the light emitted from each of the light source sections 11 and 12. FIG. 9 is a graph showing the spectrum of the green light LG after passing through the filter 15. In FIGS. 8 and 9, the horizontal axis represents the wavelength (nm), and the vertical axis represents the relative luminance (−).

As shown in FIG. 8, the first light emitters 27 of the first light source section 11 each emit the blue light LBs, which belongs to the blue wavelength band of 455 nm±10 nm. The second light emitters 32 of the second light source section 12 each emit the red light LR, which belongs to the red wavelength band of 640 nm±10 nm. The wavelength converter 13 emits the green light LG, which belongs to the green wavelength band ranging from 470 to 650 nm.

In the emission spectra described above, the first optical film 41 of the filter 15 removes short wavelength components ranging from about 470 to 520 nm from the green light LG emitted from the wavelength converter 13, and transmits the components that form the remaining wavelength band, as shown in FIG. 3. The first optical film 41 further transmits the blue light LBp having a center wavelength of 455 nm and the red light LR having a center wavelength of 640 nm. The first optical film 41 thus contributes to the removal of the short wavelength components of the green light LG.

The second optical film 42 of the filter 15 removes long wavelength components ranging from about 540 to 620 nm from the green light LG emitted from the wavelength converter 13, and transmits the components that form the remaining wavelength band, as shown in FIG. 4. The second optical film 42 further transmits the blue light LBp having the center wavelength of 455 nm and the red light LR having the center wavelength of 640 nm. The second optical film 42 thus contributes to the removal of the long wavelength components of the green light LG.

With the aid of the effects of the two optical films 41 and 42 described above, the filter 15 removes the short wavelength components ranging from 470 to 520 nm and the long wavelength components ranging from 540 to 620 nm from the green light LG, which is emitted from the wavelength converter 13 and belongs to the third wavelength band ranging from 470 to 650 nm. The filter 15 can thus narrow the wavelength band of the green light LG to a wavelength band of about 530 nm±20 nm, as shown in FIG. 9.

The third optical film 37 of the light combiner 14 transmits the P-polarized component and reflects the S-polarized component of the blue light LBs and the blue light LBp, which belong to the first wavelength band, as shown in FIG. 5. The third optical film 37 transmits the red light LR, which belongs to the second wavelength band, and the green light LG, which belongs to the third wavelength band. The third optical film 37 thus functions as a polarization separation film for the blue light LBs and LBp.

The fourth optical film 38 of the light combiner 14 transmits the blue light LBp, which belongs to the first wavelength band, reflects the green light LG, which belongs to the third wavelength band, and transmits the red light LR, which belongs to the second wavelength band, as shown in FIG. 6. The fourth optical film 38 further transmits long wavelength components of the green light LG, which belongs to the third wavelength band. The fourth optical film 38 thus functions as a wavelength selection film.

With the aid of the effects of the two optical films 37 and 38, the light combiner 14 can achieve the function of transmitting the blue light LBp formed of the P-polarized component and reflecting the blue light LBs formed of the S-polarized component out of the blue light LBs and LBp output from the first light source section 11, transmitting the red light LR, and reflecting the green light LG.

Note that the filter 15 may have the configuration below in place of the configuration described above.

Figure 7:
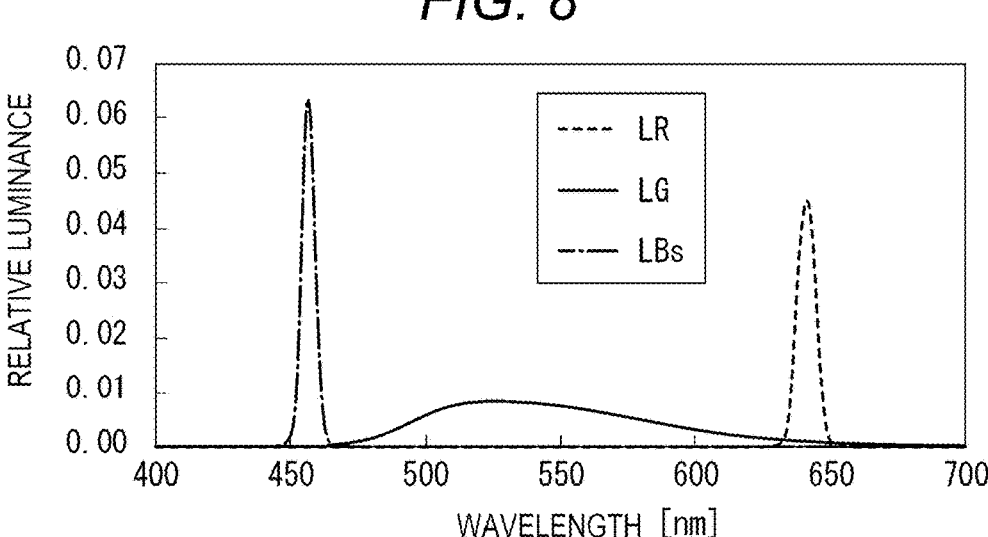
FIG. 7 is a graph showing the spectral characteristics of a first optical film of a filter according to a variation.

FIG. 7 is a graph showing the spectral characteristics of the first optical film of the filter according to a variation.

Although not shown, the filter according to the variation includes a substrate, a first optical film provided at one surface of the substrate, and an anti-reflection film provided at the other surface of the substrate.

The first optical film of the filter according to the variation only transmits components ranging from about 520 to 550 nm out of the green light LG, which is emitted from the wavelength converter 13 and belongs to the green wavelength band ranging from 470 to 650 nm, as shown in FIG. 7. The first optical film further transmits the blue light LBp having the center wavelength of 455 nm and the red light LR having the center wavelength of 640 nm.

As described above, the green light LG contained in the combined light LW, which exits out of the light combiner 14, passes through the filter 15, which narrows the wavelength band of the green light LG to improve the color purity thereof. On the other hand, the blue light LBp and the red light LR are each inherently narrow-band light derived from semiconductor lasers, and each still have the high color purity even after passing through the filter 15. The filter 15 disposed in the optical path of the combined light LW can therefore widen the color gamut of the combined light LW, and can hence improve the color reproducibility. On the other hand, when the filter 15 is disposed outside the optical path of the combined light LW, the portion of the components of the green light LG are not removed by the filter 15, so that the luminance of the combined light LW can be increased.

The light source apparatus 100 according to the present embodiment includes the parallelizer 16, which is provided on the light incident side of the filter 15 and substantially parallelizes the green light LG emitted from the wavelength converter 13. The light source apparatus 100 further includes the light collection and pickup element 19, which is provided on the light incident side of the filter 15 and substantially parallelizes the blue light LBc2 and the red light LR having exited out of the diffusion plate 44. The filter 15 is so oriented that the light incident surface 15a thereof intersects with the optical path of the chief ray of the combined light LW containing the green light LG at the angle of 90 degrees. The configuration described above causes the combined light LW to be incident on the light incident surface 15a of the filter 15 at right angles. It is therefore not necessary to consider the dependence of the characteristics of the filter 15 on the angle of incidence of the light incident thereon when designing the optical films 41 and 42 of the filter 15, so that the characteristics of the filter 15 can be readily improved, and the filter 15 can be easily manufactured.

A specific example of how the controller 24 controls the values of the current supplied to the light source sections 11 and 12 will be described below.

In the inventor's study, the color temperature of a projector using a specific optical system is set at 6500K, and the deviation of the color temperature is set at 0.003. On the assumption that the color gamut satisfies the DCI-P3 standard with the filter 15 not placed in the optical path, the proportions of the amounts of the red light, the green light, and the blue light that ensure a predetermined white balance are 160%, 100%, and 58%, respectively.

Thereafter, assume that the filter 15 is placed in the optical path to improve the color reproducibility. In this arrangement, part of the green light LG is removed by the filter 15, so that the amount of green light LG decreases. In this case, to ensure the same white balance as that achieved when the filter 15 is not placed in the optical path, it is necessary to reduce the amounts of red light LR and blue light LBp in accordance with the decrease in the amount of green light LG. The proportions of the amounts of the red light, the green light, and the blue light set when the filter 15 is placed in the optical path are therefore 75%, 100%, and 15.9%, respectively.

As described above, when the filter 15 is placed in the optical path, the balance between the amount of green light LG and the amount of blue light LBp changes from the balance in the state in which the filter 15 is not placed in the optical path. To avoid the change, the first phase retarder 29 is rotated to change the ratio between the amount of P-polarized component and the amount of S-polarized component to adjust the balance between the amount of the green light LG and the amount of blue light LBp. When the filter 15 is placed in the optical path, the balance between the amount of green light LG and the amount of red light LR also changes from the balance in the state in which the filter 15 is not placed in the optical path. To avoid the change, the controller 24 controls the value of the current supplied to the second light emitters 32 in such a way that the current value in the state in which the filter 15 is placed in the optical path is smaller than the current value in the state in which the filter 15 is not placed in the optical path.

When the light source apparatus 100 has a configuration in which current from a single power supply is distributed to the first light emitters 27 and the second light emitters 32, and the value of the current supplied to the second light emitters 32 is reduced, the power supply has a large power capacity margin, and a large amount of current can be distributed to the first light emitters 27. In this case, the controller 24 controls the value of the current supplied to the first light emitters 27 in such a way that the current value in the state in which the filter 15 is placed in the optical path is greater than the current value in the state in which the filter 15 is not placed in the optical path.

In the light source apparatus 100 according to the present embodiment, the controller 24 can minimize the decrease in the brightness when the filter 15 is placed in the optical path while adjusting the white balance of the combined light LW output from the light source device 100 by performing the control described above.

A preferable movement direction of the filter 15 will be described below with reference to FIGS. 10 and 11.

Figure 10:
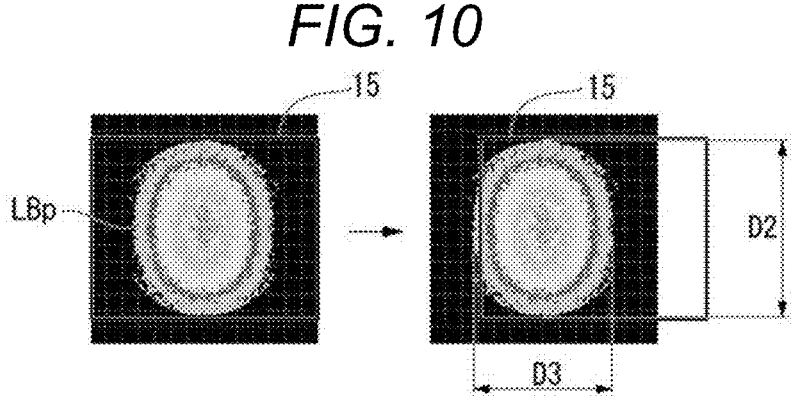
FIG. 10 shows the relationship between the illuminance distribution of blue light and the movement direction of the filter.

FIG. 10 shows the relationship between the illuminance distribution of the blue light LBp on the filter 15 and the movement direction of the filter 15. FIG. 11 shows the relationship between the illuminance distribution of the green light LG on the filter 15 and the movement direction of the filter 15.

In general, light emitted from a semiconductor laser has an elliptical cross-sectional shape having a major axis and a minor axis. In the present specification, the cross-sectional shape of the light is defined as the cross-sectional shape viewed in the direction perpendicular to the chief ray of the light. Therefore, in the present embodiment, the cross-sectional shape of the blue light LBp at the point of incidence on the filter 15 is not circular even when the blue light LBp is diffused by the diffusion plate 44 but is maintained elliptical in many cases, as shown in FIG. 10, although the cross-sectional shape slightly changes depending on the number and arrangement of the first light emitters 27.

Figure 11:
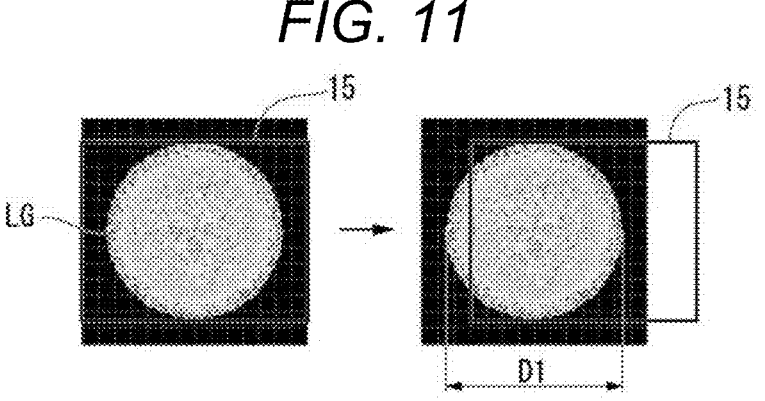
FIG. 11 shows the relationship between the illuminance distribution of green light and the movement direction of the filter.

On the other hand, since the green light LG is emitted in the isotropic Lambertian scheme from the wavelength converter 13, the cross-sectional shape of the green light LG at the point of incidence on the filter 15 is kept circular in many cases as shown in FIG. 11. To suppress the color unevenness in the optical system downstream from the filter 15, a length D1 of the diameter of the cross-sectional shape of the green light LG is set to substantially coincide with either a length D2 of the diameter of the cross-sectional shape of the blue light LBp in the direction along the major axis or a length D3 of the diameter in the direction along the minor axis. In the examples shown in FIGS. 10 and 11, the length D1 of the diameter of the cross-sectional shape of the green light LG is substantially equal to the length D2 of the diameter of the cross-sectional shape of the blue light LBp in the direction along the major axis. Conversely, the length D1 of the diameter of the cross-sectional shape of the green light LG may substantially be equal to the length D3 of the diameter of the cross-sectional shape of the blue light LBp in the direction along the minor axis.

It is assumed that the filter 15 is moved in the direction along the minor axis of the cross-sectional shape of the blue light LBp (horizontal direction in FIGS. 10 and 11), as shown in FIGS. 10 and 11. In this case, during the movement of the filter 15, the blue light LBp passes through the filter 15 in the entire region, while part of the green light LG does not pass through the filter 15 for a certain period, as shown in the right portion of FIGS. 10 and 11. Color unevenness may therefore occur during the movement of the filter 15 at the time of the mode switching. Therefore, moving the filter 15 in the direction along the major axis of the cross-sectional shape of the blue light LBp (vertical direction in FIGS. 10 and 11) does not cause the situation in which one of the blue light and the green light passes through the filter 15 in the entire region but part of the other light does not pass therethrough. The occurrence of the color unevenness during the movement of the filter 15 is thus avoided. That is, when the length D1 of the diameter of the cross-sectional shape of the green light LG is substantially equal to one of the length D2 of the diameter of the cross-sectional shape of the blue light LBp in the direction along the major axis thereof or the length D3 of the diameter of the cross-sectional shape in the direction along the minor axis, it is desirable to move the filter 15 in the direction along the axis along which the two lengths are substantially equal to each other out of the direction along the major axis and the direction along the minor axis.

Effects of First Embodiment

The light source apparatus 100 according to the present embodiment includes the first light source section 11, which outputs the blue light LBs and the blue light LBp, which belong to the first wavelength band containing the S-polarized component and the P-polarized component, the second light source section 12, which outputs the red light LR, which belongs to the second wavelength band, the wavelength converter 13, which converts the blue light LBp into the green light LG, which belongs to the third wavelength band, the light combiner 14, which combines the blue light LBp, the red light LR, and the green light LG with one another and outputs the combined light LW, and the filter 15, which attenuates light that belongs to part of the third wavelength band when the green light LG is incident thereon. The light combiner 14, which receives the blue light LBs and LBp output from the first light source section 11, reflects the blue light LBs formed of the S-polarized component and transmits the blue light LBp formed of the P-polarized component to output the blue light LBp formed of the P-polarized component toward the wavelength converter 13, outputs the blue light LBs formed of the S-polarized component toward the diffuser 17, transmits the blue light LBp and the red light LR, and reflects the green light LG. The filter 15 is movable between the first position, where the green light LG passes through the filter 15, and the second position, where the green light LG does not pass through filter 15.

According to the configuration described above, light that belongs to part of the wavelength band to which the green light LG belongs is attenuated at the first position, where the green light LG passes through the filter 15, so that the green light LG becomes narrow-band light and has improved color purity, as described above. The color gamut of the combined light LW thus widens, resulting in improved color reproducibility. On the other hand, at the second position, where the green light LG does not pass through the filter 15, the light that belongs to part of the wavelength band to which the green light LG belongs is not attenuated by the filter 15, so that the luminance of the combined light LW can be increased. Moving the filter 15 between the first position and the second position as described above can change the characteristics of the combined light LW output from the light source apparatus 100. As a result, when the light source apparatus 100 is incorporated in the projector 10, the color-reproducibility-oriented mode and the luminance-oriented mode can be switched from one to the other by moving the filter 15.

The projector 10 according to the present embodiment includes the light source apparatus 100 according to the present embodiment, the light modulators 400R, 400G, and 400B, which modulate light output from the light source apparatus 100 and containing the combined light LW in accordance with image information, and the projection optical apparatus 600, which projects the light modulated by the light modulators 400R, 400G, and 400B.

The configuration described above, in which the light source apparatus 100 can switch the operation mode thereof between the color-reproducibility-oriented mode and the luminance-oriented mode, allows the user, for example, to selectively use the projector 10 in an application in which the user views movies and other audiovisual materials with the images projected in enhanced expression and an application in which the projector 10 displays documents and other materials in a bright room.

Second Embodiment

A second embodiment of the present disclosure will be described below with reference to FIG. 12.

The basic configuration of the projector according to the second embodiment is the same as that according to the first embodiment but differs therefrom in terms of the configuration of the light source apparatus. The basic configuration of the projector will therefore not be described.

Figure 12:
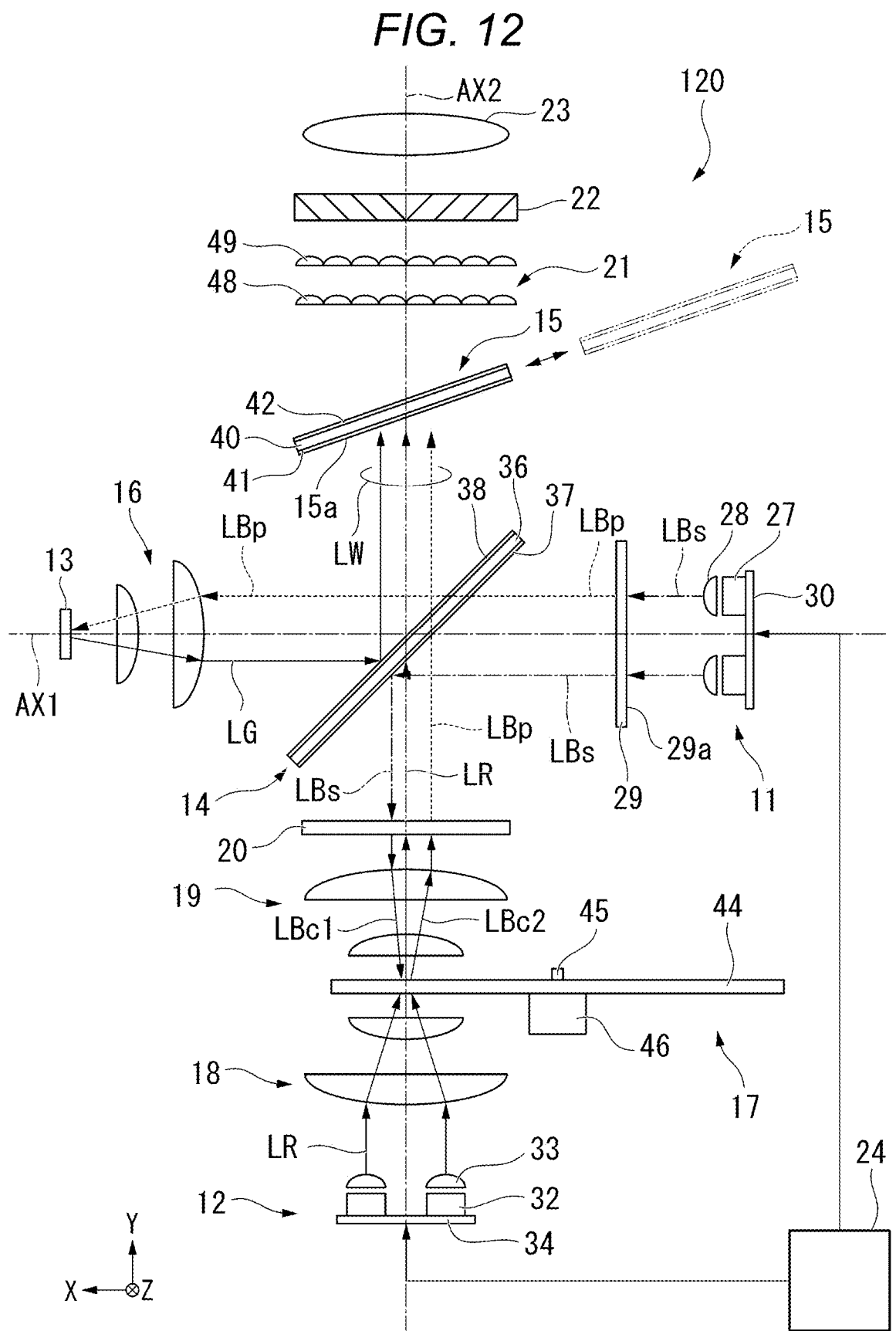
FIG. 12 is a schematic configuration diagram of the light source apparatus according to a second embodiment.

FIG. 12 is a schematic configuration diagram of a light source apparatus 120 according to the second embodiment.

In FIG. 12, components common to those in FIG. 2 used in the first embodiment have the same reference characters and will not be described.

The light source apparatus 120 according to the present embodiment includes the first light source section 11, the second light source section 12, the wavelength converter 13, the light combiner 14, the filter 15, the parallelizer 16, the diffuser 17, the light collector 18, the light collection and pickup element 19, the second phase retarder 20, the optical integrator 21, the polarization converter 22, the superimposing lens 23, and the controller 24, as shown in FIG. 12.

In the first embodiment, the filter 15 is so oriented that the light incident surface 15a intersects with the optical path of the chief ray of the combined light LW containing the green light LG at the angle of 90 degrees. In contrast, in the present embodiment, the filter 15 is so oriented that the light incident surface 15a inclines with respect to the optical path of the chief ray of the combined light LW (optical axis AX2) containing the green light LG at an angle different from 90 degrees. The other configurations of the light source apparatus 120 are the same as those in the first embodiment.

Effects of Second Embodiment

The light source apparatus 120 according to the present embodiment also provides the same effects as those provided by the first embodiment, for example, moving the filter 15 between the first position and the second position allows a change in the characteristics of the combined light LW output from the light source apparatus 120, so that the light source apparatus 120 incorporated in the projector 10 allows switching between the color-reproducibility-oriented mode and the luminance-oriented mode.

Furthermore, in the present embodiment, the filter 15 is so oriented that the light incident surface 15a inclines with respect to the optical path of the chief ray of the combined light LW containing the green light LG at an angle different from 90 degrees. The configuration described above, in which part of the combined light LW reflected off the filter 15 travels along a path different from that of the combined light LW incident on the filter 15, allows reduction in the amount of light reflected off the filter 15 and then returning to the wavelength converter 13 and the light emitters 27 and 32. The reliability of the wavelength converter 13 and the light emitters 27 and 32 can thus be improved. For example, the light traveling toward the wavelength converter 13 may be incident on the substrate that supports the wavelength converter 13. According to the configuration described above, heat generated by the reflected light can be dissipated via the support substrate, so that the reliability of the wavelength converter 13 can be improved.

Third Embodiment

A third embodiment of the present disclosure will be described below with reference to FIGS. 13 and 14.

The basic configuration of the projector according to the third embodiment is the same as that according to the first embodiment but differs therefrom in terms of the configuration of the light source apparatus. The basic configuration of the projector will therefore not be described.

Figure 13:
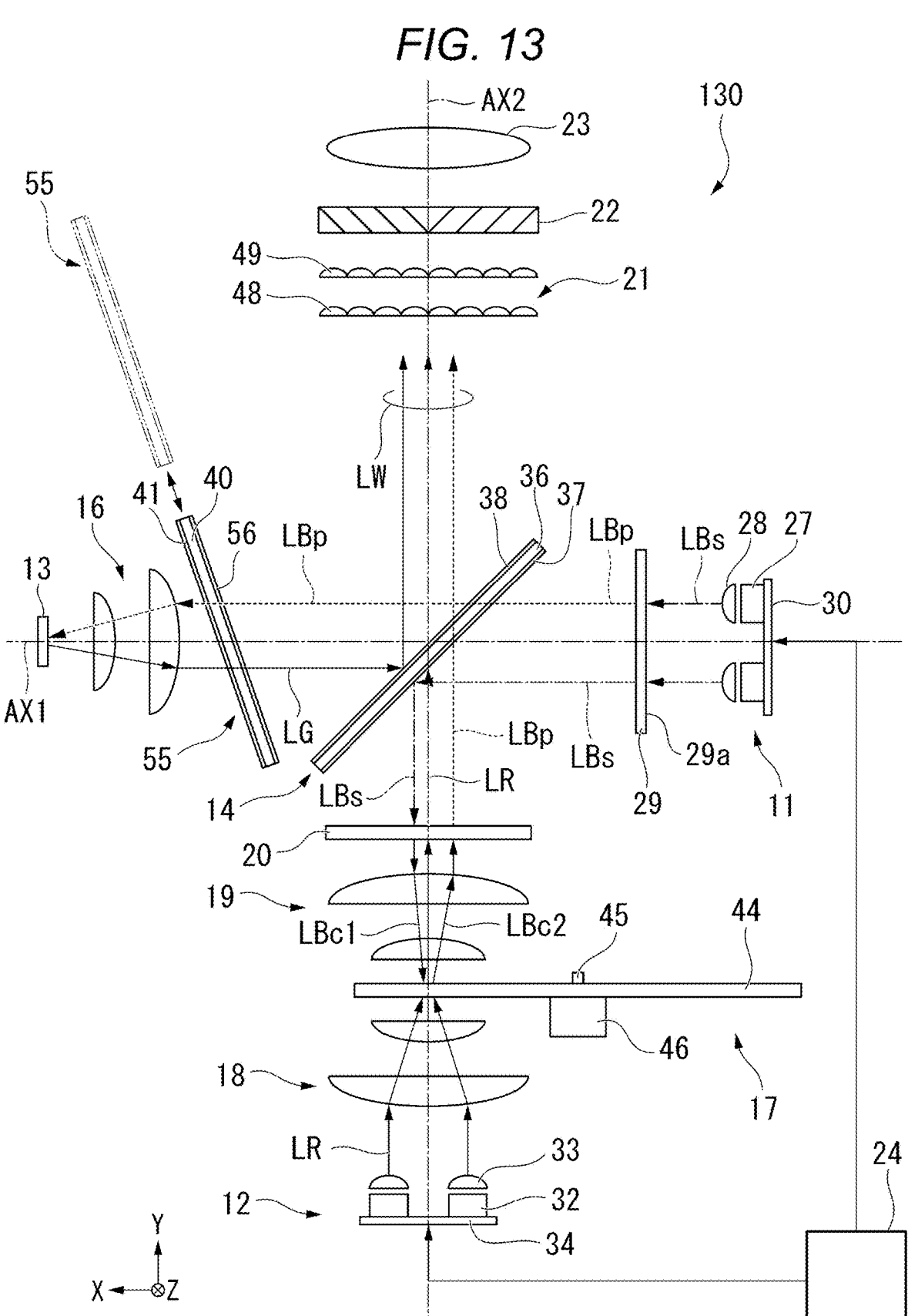
FIG. 13 is a schematic configuration diagram of the light source apparatus according to a third embodiment.

FIG. 13 is a schematic configuration diagram of a light source apparatus 130 according to the third embodiment.

In FIG. 13, components common to those in FIG. 2 used in the first embodiment have the same reference characters and will not be described.

The light source apparatus 130 according to the present embodiment includes the first light source section 11, the second light source section 12, the wavelength converter 13, the light combiner 14, a filter 55, the parallelizer 16, the diffuser 17, the light collector 18, the light collection and pickup element 19, the second phase retarder 20, the optical integrator 21, the polarization converter 22, the superimposing lens 23, and the controller 24, as shown in FIG. 13.

The light source apparatus 130 according to the present embodiment differs from the light source apparatus 100 according to the first embodiment in terms of the position of the filter 55. Specifically, in the present embodiment, the filter 55 is provided on the optical axis AX1 between the light combiner 14 and the wavelength converter 13. In the first embodiment, the combined light LW as a result of the combination performed by the light combiner 14, that is, the entire color light enters the filter 55. In contrast, in the present embodiment, the green light LG before undergoing the combination performed by the light combiner 14 and the blue light LBp that exits out of the light combiner 14 enter the filter 55, but the red light LR does not enter the filter 55. The other configurations of the light source apparatus 130 are the same as those in the first embodiment.

Figure 14:
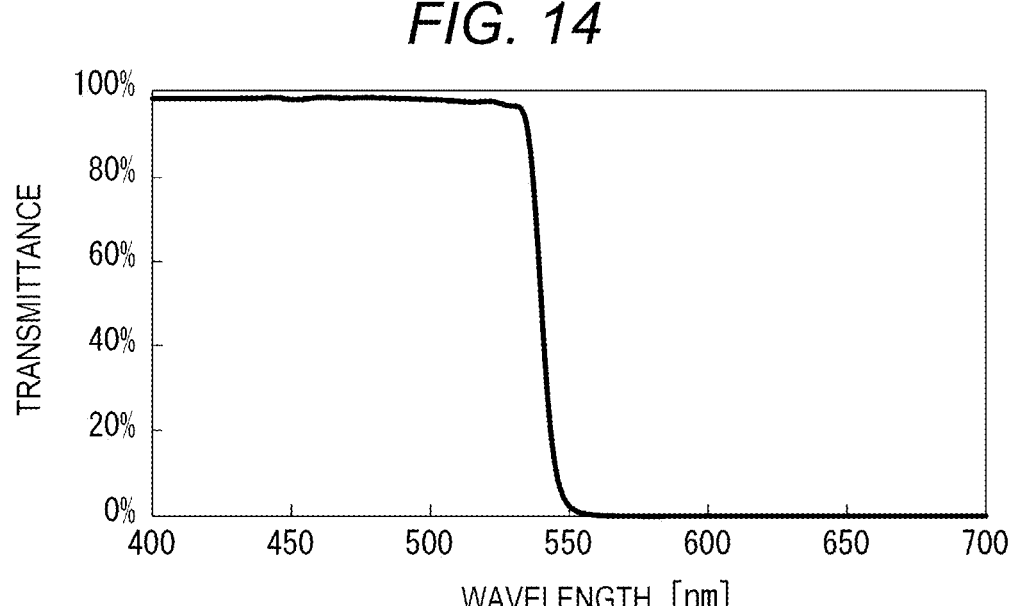
FIG. 14 is a graph showing the spectral characteristics of the second optical film of the filter.

FIG. 14 is a graph showing the spectral characteristics of a second optical film 56 of the filter 55 in the present embodiment. In FIG. 14, the horizontal axis represents the wavelength (nm), and the vertical axis represents the transmittance (s).

The second optical film 56 of the filter 55 removes long wavelength components having wavelength longer than or equal to about 550 nm from the green light LG emitted from the wavelength converter 13, as shown in FIG. 14. The first optical film 41 is the same as the first optical film 41 in the first embodiment (see FIG. 3). With the aid of the effects of the two optical films 56 and 41, the filter 55 removes light having short wavelength components ranging from 470 to 520 nm and long wavelength components longer than or equal to 550 nm from the green light LG, which is emitted from the wavelength converter 13 and belongs to the third wavelength band ranging from 470 to 650 nm. The filter 55 can thus narrow the wavelength band of the green light LG.

Effects of Third Embodiment

Also the light source apparatus 130 according to the present embodiment can provide the same effects as those provided by the first embodiment, for example, moving the filter 55 between the first position and the second position allows a change in the characteristics of the combined light LW output from the light source apparatus 130, so that the light source apparatus 130 incorporated in the projector 10 allows switching between the color-reproducibility-oriented mode and the luminance-oriented mode.

In the present embodiment, the second optical film 42 in the first embodiment can be used as the second optical film of the filter 55, but the second optical film 56 having the spectral characteristics shown in FIG. 14 described above is desirably used. According to the configuration described above, the second optical film 56 removes the long wavelength components of the green light LG but does not need to transmit the red light LR, so that the specifications of the second optical film 56 are simpler than those of the second optical film 42 in the first embodiment shown in FIG. 4. Therefore, the manufacturing cost of the filter 55 can be reduced, and desired spectral characteristics of the filter 55 is readily achieved.

Fourth Embodiment

A fourth embodiment of the present disclosure will be described below with reference to FIGS. 15 and 16.

The basic configuration of the projector according to the fourth embodiment is the same as that according to the first embodiment but differs therefrom in terms of the configuration of the light source apparatus. The basic configuration of the projector will therefore not be described.

Figure 15:
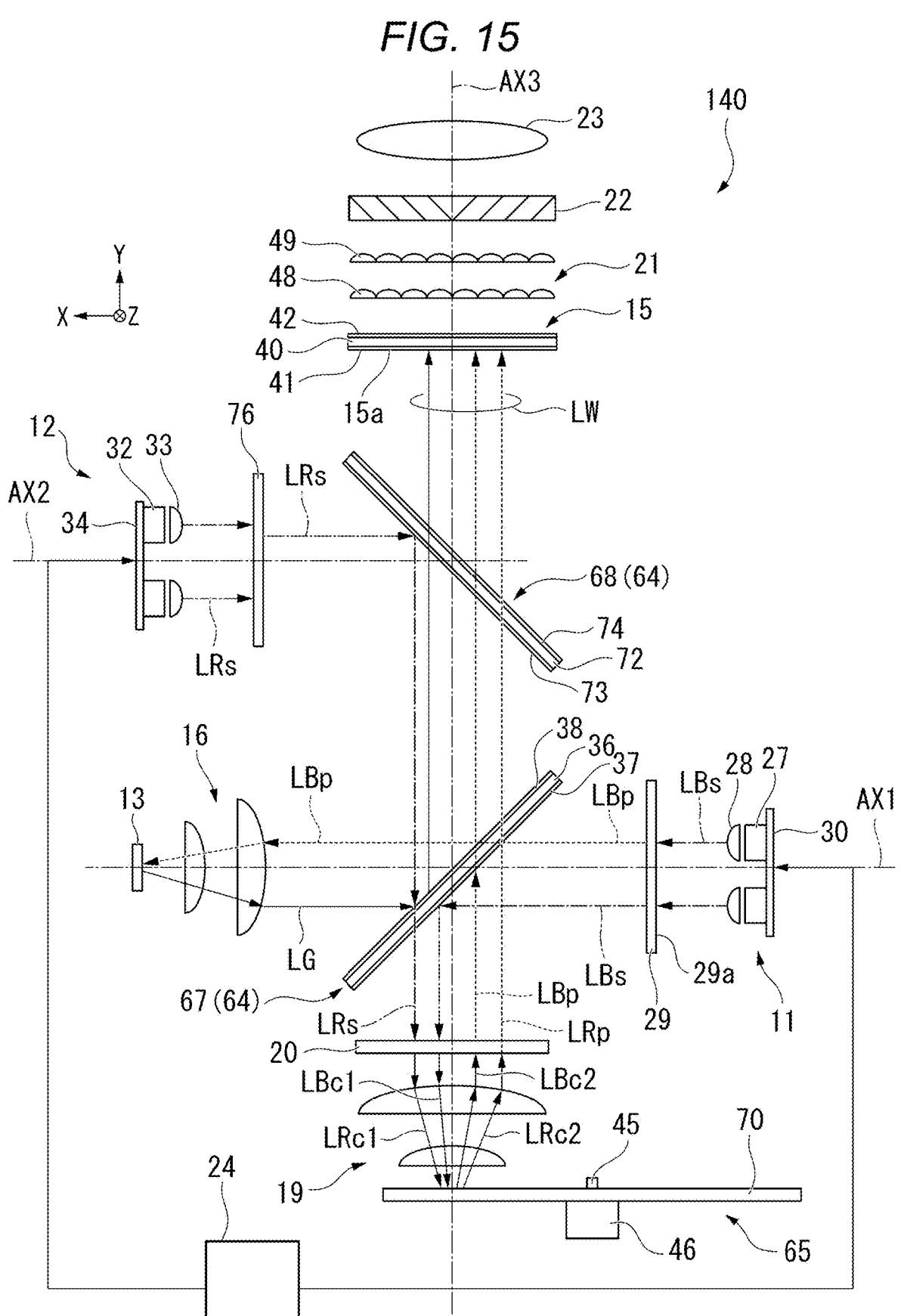
FIG. 15 is a schematic configuration diagram of the light source apparatus according to a fourth embodiment.

FIG. 15 is a schematic configuration diagram of a light source apparatus 140 according to the fourth embodiment.

In FIG. 15, components common to those in FIG. 2 used in the first embodiment have the same reference characters and will not be described.

The light source apparatus 140 according to the present embodiment includes the first light source section 11, the second light source section 12, the wavelength converter 13, a light combiner 64, the filter 15, the parallelizer 16, a diffuser 65, the light collector 18, the light collection and pickup element 19, the second phase retarder 20, the optical integrator 21, the polarization converter 22, the superimposing lens 23, and the controller 24, as shown in FIG. 15. The light source apparatus 140 according to the present embodiment differs from the light source apparatus 100 according to the first embodiment in terms of the configuration of the light combiner 64, the position of the second light source section 12, and the configuration of the diffuser 65.

In the present embodiment, the light combiner 64 is formed of a first light combiner 67 and a second light combiner 68. The configuration and optical characteristics of the first light combiner 67 are the same as those of the light combiner 14 in the first embodiment. The positional relationship of the first light source section 11, the wavelength converter 13, and the diffuser 65 with the first light combiner 67 is also the same as that in the first embodiment.

An axis along the chief ray of the light that exits out of a diffusion plate 70 is defined as an optical axis AX3. The optical axis AX3 coincides with the optical axes of the optical integrator 21, the polarization converter 22, the superimposing lens 23, and other components. In the first embodiment, the optical axis AX1 of the first light source section 11 and the optical axis AX2 of the second light source section 12 are perpendicular to each other. On the other hand, in the present embodiment, the optical axis AX1 of the first light source section 11 and the optical axis AX2 of the second light source section 12 are parallel to the axis X, parallel to each other, and perpendicular to the optical axis AX3 parallel to the axis Y.

The second light combiner 68 is provided on the optical axis AX3 between the first light combiner 67 and the filter 15. The second light combiner 68 is provided at a position where the optical axis AX2 of the second light source section 12 intersects with the optical axis AX3. The second light combiner 68 includes a substrate 72, a fifth optical film 73 provided at one surface of the substrate 72, and an anti-reflection film 74 provided at the other surface of the substrate 72. The fifth optical film 73 is formed of a dielectric multilayer film. The second light combiner 68 is so disposed that the surfaces of the plate that forms the substrate 72 incline by 45 degrees with respect to the optical axes AX2 and AX3. A diffusion plate 76 for red light, which diffuses the red light LR, is provided on the optical axis AX2 between the second light source section 12 and the second light combiner 68.

Figure 16:
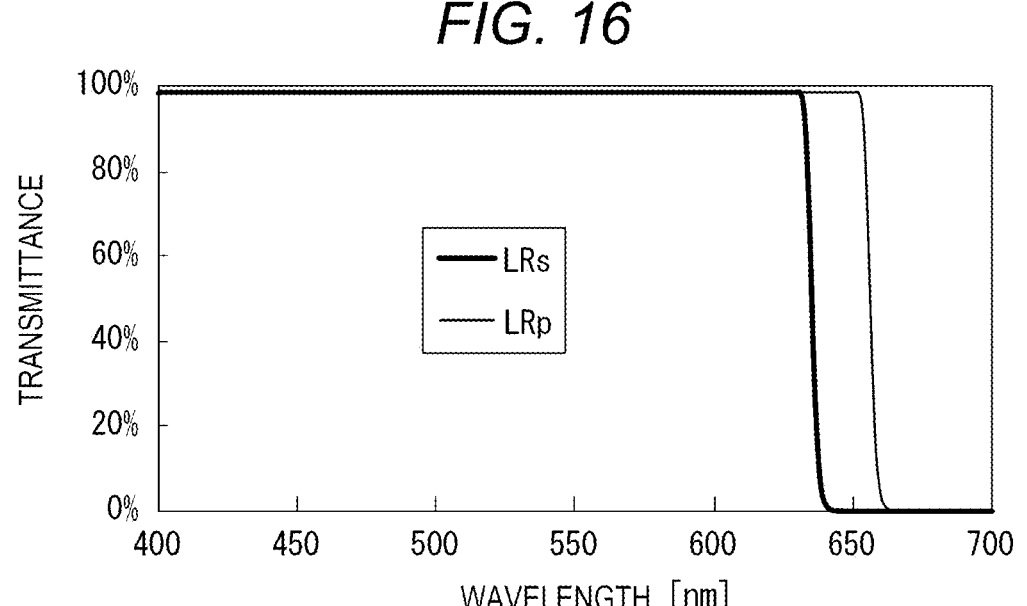
FIG. 16 is a graph showing the spectral characteristics of a fifth optical film of a second light combiner.

FIG. 16 is a graph showing the spectral characteristics of the fifth optical film 73 of the second light combiner 68. In FIG. 16, the horizontal axis represents the wavelength (nm), and the vertical axis represents the transmittance (%).

The second light combiner 68 reflects red light LRs formed of the S-polarized component, transmits red light LRp formed of the P-polarized component, and transmits the blue light LBp and the green light LG with the aid of the effect of the fifth optical film 73, as shown in FIG. 16.

The diffusion plate 44 in the first embodiment, which needs to function as a reflective diffusion plate for the blue light LBc1 and function as a transmissive diffusion plate for the red light LR, needs to include a dichroic film that reflects the blue light LBc1 and transmits the red light LR. In contrast, the diffusion plate 70 in the present embodiment only needs to function as a reflective diffusion plate for both the blue light LBc1 and red light LRc1, so that the dichroic film described above is not necessary, and a reflective film (not shown) is provided in place of the dichroic film described above.

The behavior of each of the red light, the green light, and the blue light will be described below.

The behaviors of the blue light LBs output from the first light source section 11 and the green light LG emitted from the wavelength converter 13 are the same as those in the light source apparatus 100 according to the first embodiment, and will therefore not be described.

In the second light source section 12, the red light LRs emitted from the second light emitters 32 and formed of the S-polarized component is diffused by the diffuser plate 76 for red light, is then reflected off the second light combiner 68, and passes through the first light combiner 67. The red light LRs that is formed of the S-polarized component and exits out of the first light combiner 67 passes through the second phase retarder 20, which converts the red light LRs into predetermined circularly polarized light, for example, right-handed circularly polarized red light LRc1, as the blue light LBs formed of the S-polarized component and output from the first light source section 11 does. In the present embodiment, the second phase retarder 20 imparts a phase retardation to each of the blue light LBs and the red light LRs. The right-handed circularly polarized red light LRc1 is collected by the light collection and pickup element 19 and enters the diffusion plate 70. The right-handed circularly polarized red light LRc1 is diffused by the diffusion plate 70 and converted into left-handed circularly polarized red light LRc2. The left-handed circularly polarized red light LRc2 is parallelized by the light collection and pickup element 19, and then passes through the second phase retarder 20, which converts the red light LRc2 into the P-polarized red light LRp. The red light LRp formed of the P-polarized component passes through the first light combiner 67, passes through the second light combiner 68, and travels toward the filter 15.

As described above, the blue light LBp, the green light LG, and the red light LRp are combined with one another by the light combiner 64, which is formed of the first light combiner 67 and the second light combiner 68. The white combined light LW exits out of the light combiner 64. The effect of the filter 15 is the same as that in the first embodiment.

Effects of Fourth Embodiment

Also the light source apparatus 140 according to the present embodiment can provide the same effects as those provided by the first embodiment, for example, moving the filter 15 between the first position and the second position allows a change in the characteristics of the combined light LW output from the light source apparatus 140, so that the light source apparatus 140 incorporated in the projector 10 allows switching between the color-reproducibility-oriented mode and the luminance-oriented mode.

In the present embodiment, the filter 15 is provided on the optical axis AX3 between the second light combiner 68 and the optical integrator 21, and may instead be provided on the optical axis AX3 between the first light combiner 67 and the second light combiner 68.

Fifth Embodiment

A fifth embodiment of the present disclosure will be described below with reference to FIGS. 17 and 18.

The basic configuration of the projector according to the fifth embodiment is the same as that according to the first embodiment but differs therefrom in terms of the configuration of the light source apparatus. The basic configuration of the projector will therefore not be described.

Figure 17:
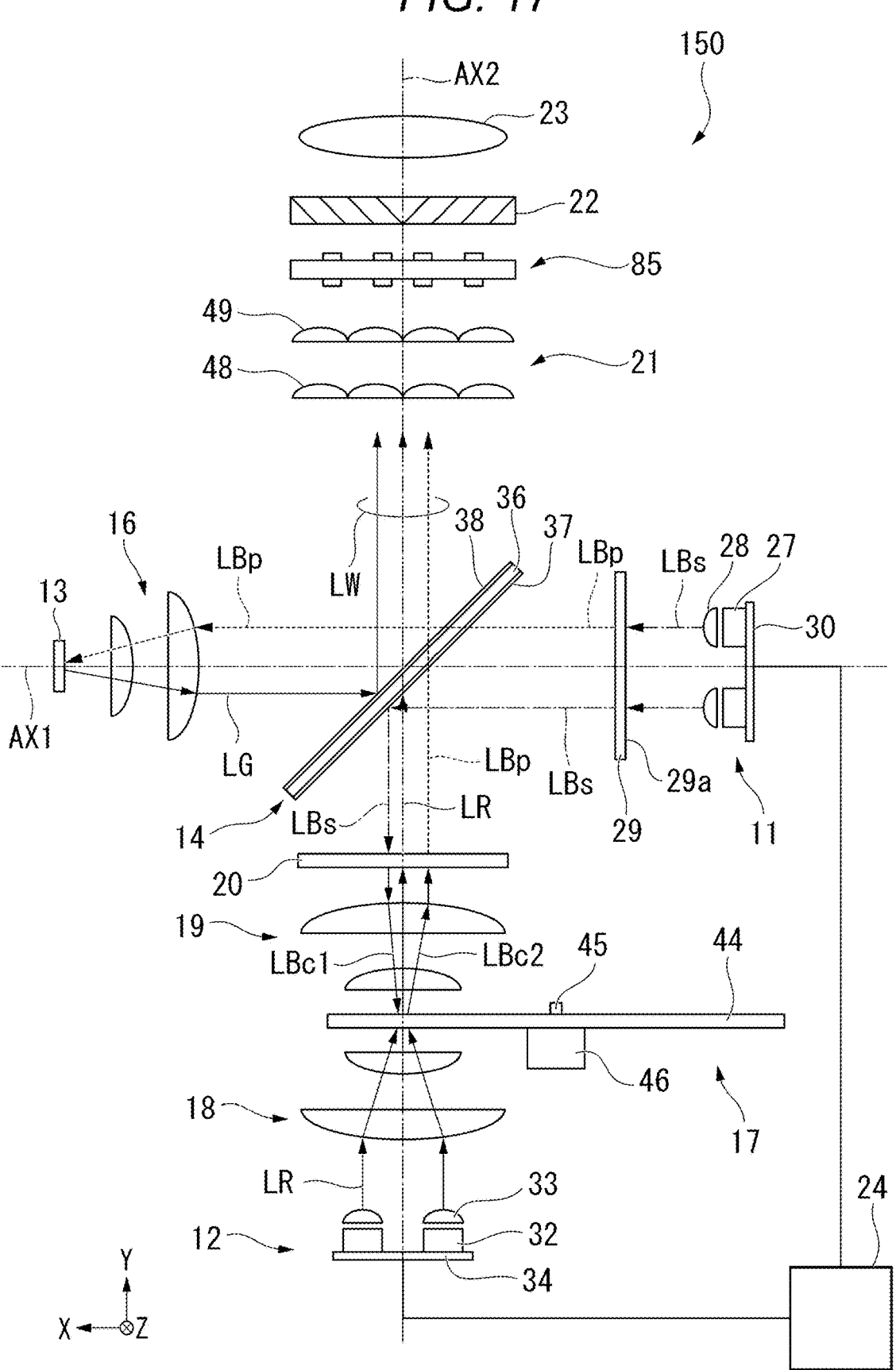
FIG. 17 is a schematic configuration diagram of the light source apparatus according to a fifth embodiment.

FIG. 17 is a schematic configuration diagram of a light source apparatus 150 according to the fifth embodiment.

In FIG. 17, components common to those in FIG. 2 used in the first embodiment have the same reference characters and will not be described.

The light source apparatus 150 according to the present embodiment includes the first light source section 11, the second light source section 12, the wavelength converter 13, the light combiner 14, a filter 85, the parallelizer 16, the diffuser 17, the light collector 18, the light collection and pickup element 19, the second phase retarder 20, the optical integrator 21, the polarization converter 22, the superimposing lens 23, and the controller 24, as shown in FIG. 17.

The light source apparatus 150 according to the present embodiment differs from the light source apparatus 100 according to the first embodiment in terms of the position and configuration of the filter 85. Specifically, in the present embodiment, the filter 85 is provided on the optical axis AX2 between the optical integrator 21 and the wavelength converter 22. In other words, the optical integrator 21 is provided on the light incident side of the filter 85. The polarization converter 22 is provided on the light exiting side of the filter 85. It is desirable that the filter 85 be disposed at a position close to the polarization converter 22.

The optical integrator 21 in the present embodiment corresponds to the first optical element in the claims. The polarization converter 22 in the present embodiment corresponds to the second optical element in the claims.

Figure 18:
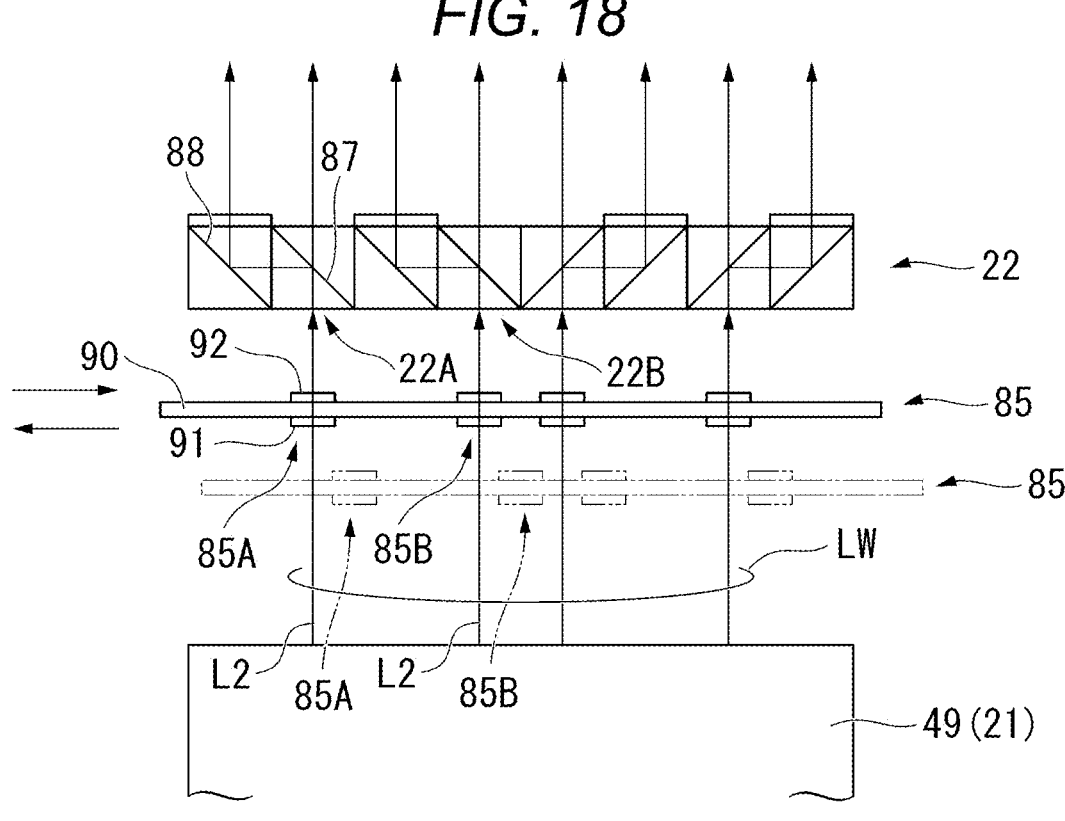
FIG. 18 is an enlarged view of key parts of the light source apparatus.

FIG. 18 is an enlarged view showing the filter 85 and the polarization converter 22 and therearound. In FIG. 18, the filter 85 placed at the first position is drawn with solid lines, and the filter 85 placed at the second position is drawn with broken lines. Furthermore, the position of the filter 85 placed at the first position and the position of the filter 85 placed at the second position are shifted in the light traveling direction for clarity of the figure.

As described in the first embodiment, the first multi-lens array 48 of the optical integrator 21 divides the combined light LW that exits out of the light combiner 14 into a plurality of luminous fluxes, and causes the plurality of luminous fluxes to enter the second multi-lens array 49. The plurality of luminous fluxes that form the combined light LW therefore exit out of the second multi-lens array 49, as shown in FIG. 18. Any two adjacent luminous fluxes out of the plurality of luminous fluxes are referred to as a first luminous flux L1 and a second luminous flux L2.

On the other hand, the polarization converter 22 has a configuration in which a plurality of polarization separation films 87 and a plurality of reflection films 88 are alternately arranged, and the plurality of luminous fluxes need to enter the plurality of respective polarization separation films 87. The polarization converter 22 therefore has a plurality of light incident regions corresponding to the plurality of polarization separation films 87. In the polarization converter 22 shown in FIG. 18, the light incident region on which the first luminous flux L1 is incident is referred to as a first light incident region 22A, and the light incident region on which the second luminous flux L2 is incident is referred to as a second light incident region 22B.

The filter 85 includes a substrate 90, a first optical film 91 provided at one surface of the substrate 90, and a second optical film 92 provided at the other surface of the substrate 90. The first optical film 91 and the second optical film 92 are each formed of a dielectric multilayer film. In the first to fourth embodiments, the first and second optical films are provided over the entire surfaces of the substrate, whereas in the present embodiment, the first optical film 91 and the second optical film 92 are each divided and provided in correspondence with the plurality of light incident regions of the polarization converter 22. Therefore, in the following description, one region of the filter 85 that is provided with the divided first optical film 91 and second optical film 92 is referred to as a filter section. A filter section on which the first luminous flux L1 is incident is referred to as a first filter section 85A, and a filter section on which the second luminous flux L2 is incident is referred to as a second filter section 85B. The spectral characteristics of the first optical film 91 and the second optical film 92 are the same as the spectral characteristics of the first optical film 41 and the second optical film 42 in the first embodiment.

In the present embodiment, when the filter 85 is placed at the first position, the first filter section 85A is placed at a position where the first filter section 85A faces the first light incident region 22A of the polarization converter 22, and the second filter section 85B is placed at a position where the second filter section 85B faces the second light incident region 22B of the polarization converter 22, as indicated by the solid lines in FIG. 18. In this arrangement, the combined light LW containing the green light LG passes through the filter 85. When the filter 85 is placed at the second position, the first filter section 85A is placed at a position where the first filter section 85A faces the region between the first light incident region 22A and the second light incident region 22B of the polarization converter 22, as indicated by the broken lines in FIG. 18. In this arrangement, the combined light LW containing the green light LG does not pass through the filter 85, but passes through the substrate 90 between the two adjacent filter sections.

Effects of Fifth Embodiment

The light source apparatus 150 according to the present embodiment can also provide the same effects as those provided by the first embodiment, for example, moving the filter 85 between the first position and the second position allows a change in the characteristics of the combined light LW output from the light source apparatus 150, so that light source apparatus 150 incorporated in the projector 10 allows switching between the color-reproducibility-oriented mode and the luminance-oriented mode.

In the light source apparatus 150 according to the present embodiment, when the filter 85 is moved between the first position and the second position, there is no need to move the entire filter 85 to a position outside the region through which the plurality of luminous fluxes pass, but the filter 85 only needs to be moved by the amount corresponding to the width of one light incident region of the polarization converter 22. As described above, in the present embodiment, the distance over which the filter 85 is moved can be reduced as compared with the distance in the light source apparatuses according to the first to fourth embodiments, so that the size of the light source apparatus 150 can be reduced.

The technical scope of the present disclosure is not limited to the embodiments described above, and a variety of changes can be made thereto to the extent that the changes do not depart from the intent of the present disclosure. An aspect of the present disclosure can relate to an appropriate combination of the characteristic portions in the embodiments described above.

For example, the light combiner in the first embodiment is characterized in that it transmits blue light and red light and reflects green light, and the light combiner may conversely be characterized in that it reflects blue light and red light and transmits green light. The light source apparatus includes the diffuser that diffuses both the blue light and the red light, and may instead include a diffuser that diffuses the blue light and a diffuser that diffuses the red light separately. The first light source section does not necessarily include the first phase retarder. For example, a first light emitter that emits blue light formed of the P-polarized component and a first light emitter that emits blue light formed of the S-polarized component may be mixed in the first light source section.

In addition, the specific descriptions of the shape, the number, the arrangement, the materials, and other factors of the components of the light source apparatus and the projector are not limited to those in the embodiments described above and can be changed as appropriate. The aforementioned embodiments have been described with reference to the case where the light source apparatus according to the present disclosure is incorporated in a projector using liquid crystal panels, but not necessarily. The light source apparatus according to the present disclosure may be incorporated in a projector using a digital micromirror device as each of the light modulators. The projector may not include a plurality of light modulators and may instead be a single-panel projector including only one light modulator.

The aforementioned embodiments have been described with reference to the case where the light source apparatus according to the present disclosure is incorporated in a projector, but not necessarily. The light source apparatus according to the present disclosure may be used as a lighting apparatus, a headlight of an automobile, and other components.

Summary of Present Disclosure

The present disclosure will be summarized below as additional remarks.
Additional Remark 1

A light source apparatus including a first light source section that outputs first light that belongs to a first wavelength band containing a first polarized component and a second polarized component different from the first polarized component, a second light source section that outputs second light that belongs to a second wavelength band different from the first wavelength band, a wavelength converter that converts the first light into third light that belongs to a third wavelength band different from the first and second wavelength bands, a light combiner that combines the first light, the second light, and the third light with one another and outputs the combined light, and a filter that receives the third light and attenuates light that belongs to a wavelength band that is part of the third wavelength band, in which the light combiner reflects light formed of the first polarized component and transmits light formed of the second polarized component out of the first light output from the first light source section to cause one of the light formed of the first polarized component and the light formed of the second polarized component to exit toward the wavelength converter, and transmits the first light and the second light or the third light and reflects the third light or the first light and the second light, and the filter is movable between a first position where the third light passes through the filter and a second position where the third light does not pass through filter.

According to the configuration described in the additional remarks 1, moving the filter between the first position and the second position can change the characteristics of the combined light output from the light source apparatus.
Additional Remark 2

The light source apparatus described in the additional remark 1, further including a diffuser that diffuses the first light and the second light.

The configuration described in the additional remark 2 allows homogenization of the illuminance distribution of the first light and the second light and reduction in color unevenness. Furthermore, when the light source sections each have a laser light source, speckle noise produced in an image when the light source apparatus is incorporated in a projector can be suppressed. Moreover, since it is not necessary to separately prepare a diffuser that diffuses the first light and a diffuser that diffuses the second light, the number of parts and the size of the light source apparatus can be reduced.
Additional Remark 3

The light source apparatus described in the additional remark 2, in which the diffuser is disposed between the light combiner and the second light source section, and the diffuser has a configuration in which a surface on which the first light reflected off the light combiner is incident has a diffusion structure that diffuses the first light and the second light, and a surface opposite from the surface on which the first light is incident has a reflection film that reflects the first light and transmits the second light.

According to the configuration of the additional remark 3, an increase in size of the light source apparatus in a direction that intersects with the optical axis between the light combiner and the second light source section can be suppressed even when the diffuser is provided.
Additional Remark 4

The light source apparatus described in any one of the additional remarks 1 to 3, further including a parallelizer provided at the light incident side of the filter and substantially parallelizing the third light.

The configuration of the additional remark 4 eliminates the need to consider the dependence of the characteristics of the filter on the angle of incidence of the light when designing the filter, so that the characteristics of the filter can be readily improved.
Additional Remark 5

The light source apparatus described in any one of the additional remarks 1 to 4, in which the light incident surface of the filter intersects with the chief ray of the third light at an angle different from 90 degrees.

According to the configuration of the additional remark 4, the amount of light reflected off the filter and then returning to the wavelength converter and each of the light source sections can be reduced. The reliability of the wavelength converter and the light source sections can thus be improved.

Additional Remark 6

The light source apparatus described in any one of the additional remarks 1 to 5, in which the first light source section includes a first light emitter that emits the first light, and a first phase retarder that is provided between the first light emitter and the light combiner and imparts a phase retardation to the first light, the first light that exits out of the wavelength converter is incident on the wavelength converter, and the first phase retarder is rotatable around an axis that intersects with the light incident surface of the first phase retarder.

According to the configuration of the additional remark 6, rotating the first phase retarder allows a change in the ratio between the first polarized component and the second polarized component, so that the proportion of the first light incident on the wavelength converter can be changed.

Additional Remark 7

The light source apparatus according to any one of the additional remarks 1 to 6, further including a controller that controls the value of current supplied to the first light source section in such a way that the current value in the state in which the filter is located at the first position and the current value in the state in which the filter is located at the second position differ from each other.

According to the configuration of the additional remark 7, the controller can separately control the values of the current supplied to the first light source section in accordance with whether the filter is located at the first position or the second position.

Additional Remark 8

The light source apparatus described in the additional remark 7, in which the first light is blue light, the second light is red light, the third light is green light, and the controller performs the control in such a way that the value of the current supplied to the first light source section when the filter is located at the first position is greater than the value of the current supplied to the first light source section when the filter is located at the second position.

According to the configuration of the additional remark 8, the white balance of the combined light can be adjusted.

Additional Remark 9

The light source apparatus described in the additional remark 8, in which the controller further performs the control in such a way that the value of the current supplied to the second light source section when the filter is located at the first position is smaller than the value of the current supplied to the second light source section when the filter is located at the second position.

According to the configuration of the additional remark 9, the white balance of the combined light can be adjusted with a decrease in luminance thereof minimized when the filter is positioned at the first position.

Additional Remark 10

The light source apparatus described in any one of the additional remarks 1 to 9, in which the light combiner combines the third light incident along a first direction from the wavelength converter with the second light incident along a second direction that intersects with the first direction from the second light source section, and the filter is provided between the light combiner and the wavelength converter.

According to the configuration of the additional remark 10, since the second light does not pass through the filter, the specifications of the filter are simpler than those set in the case where the second light passes through the filter. Therefore, the manufacturing cost of the filter can be reduced, and desired spectral characteristics of the filter is readily achieved.

Additional Remark 11

The light source apparatus described in any one of the additional remarks 1 to 9, further including a first optical element that is provided at the light incident side of the filter and divides the combined light that exits out of the light combiner into a first luminous flux and a second luminous flux, and a second optical element that is provided at the light exiting side of the filter and has a first light incident region on which the first luminous flux is incident and a second light incident region on which the second luminous flux is incident, in which the filter includes a first filter section on which the first luminous flux is incident and a second filter section on which the second luminous flux is incident, when the filter is placed at the first position, the first filter section is placed at a position where the first filter section faces the first light incident region of the second optical element, and the second filter section is placed at a position where the second filter section faces the second light incident region of the second optical element, and when the filter is placed at the second position, the first filter section is placed at a position where the first filter section faces the region between the first light incident region and the second light incident region of the second optical element.

According to the configuration of the additional remark 11, the distance over which the filter is moved between the first position and the second position can be reduced, so that the size of the light source apparatus can be reduced.

Additional Remark 12

The light source apparatus described in any one of the additional remarks 1 to 11, in which the first light incident on the filter has an elliptical cross-sectional shape having a major axis and a minor axis, the third light incident on the filter has a circular cross-sectional shape, the length of the diameter of the cross-sectional shape of the third light is substantially equal to one of the length of the diameter of the cross-sectional shape of the first light in the direction along the major axis and the length of the diameter of the cross-sectional shape of the first light in the direction along the minor axis, and the filter is movable in the direction along the axis along which the two lengths are substantially equal to each other out of the direction along the major axis and the direction along the minor axis.

According to the configuration of the additional remark 12, occurrence of color unevenness at the time of the mode switching can be suppressed.

Additional Remark 13

A projector including the light source apparatus described in any one of the additional remarks 1 to 12, a light modulator that modulates light output from the light source apparatus and containing the combined light in accordance with image information, and a projection optical apparatus that projects the light modulated by the light modulator.

According to the configuration of the additional remark 13, a projector that allows switching between the color-reproducibility-oriented mode and the brightness-oriented mode can be achieved.

What is claimed is:

1. A light source apparatus comprising:

a first light source section that outputs first light that belongs to a first wavelength band containing a first polarized component and a second polarized component different from the first polarized component;

a second light source section that outputs second light that belongs to a second wavelength band different from the first wavelength band;

a wavelength converter that converts the first light into third light that belongs to a third wavelength band different from the first wavelength band and second wavelength band;

a light combiner that combines the first light, the second light, and the third light with one another and outputs combined light; and a filter that receives the third light and attenuates light that belongs to a wavelength band that is part of the third wavelength band, wherein:

the light combiner reflects light formed of the first polarized component and transmits light formed of the second polarized component out of the first light outputted from the first light source section, the light combiner emits one of the light formed of the first polarized component and the light formed of the second polarized component toward the wavelength converter, the light combiner transmits one of (i) the first light re-entering the light combiner and the second light, or (ii) the third light, and reflects the other of (i) the first light re-entering the light combiner and the second light, or (ii) the third light, the filter is movable between a first position where the third light passes through the filter and a second position where the third light does not pass through filter, the light combiner combines the third light incident along a first direction from the wavelength converter with the second light incident along a second direction that intersects with the first direction from the second light source section, and the filter is provided between the light combiner and the wavelength converter.

2. The light source apparatus according to claim 1, further comprising a diffuser that diffuses the first light and the second light.

3. The light source apparatus according to claim 2, wherein the diffuser is disposed between the light combiner and the second light source section, and the diffuser has a configuration in which a first surface on which the first light reflected off the light combiner is incident has a diffusion structure that diffuses the first light and the second light, and a second surface opposite from the first surface has a reflection film that reflects the first light and transmits the second light.

4. The light source apparatus according to claim 1, further comprising a parallelizer provided at a light incident side of the filter and substantially parallelizing the third light.

5. The light source apparatus according to claim 1, wherein a light incident surface of the filter intersects with a chief ray of the third light at an angle different from 90 degrees.

6. The light source apparatus according to claim 1, wherein the first light source section includes a first light emitter that emits the first light, and a first phase retarder that is disposed between the first light emitter and the light combiner and imparts a phase retardation to the first light, the first light emitted from the light combiner is incident on the wavelength converter, and the first phase retarder is rotatable around an axis that intersects with a light incident surface of the first phase retarder.

7. The light source apparatus according to claim 1, further comprising a controller that controls a value of current supplied to the first light source section in such a way that the current value in a state in which the filter is located at the first position and the current value in a state in which the filter is located at the second position differ from each other.

8. The light source apparatus according to claim 7, wherein the first light is blue light, the second light is red light, the third light is green light, and the controller performs control in such a way that the value of the current supplied to the first light source section when the filter is located at the first position is greater than the value of the current supplied to the first light source section when the filter is located at the second position.

9. The light source apparatus according to claim 8, wherein the controller further performs control in such a way that the value of the current supplied to the second light source section when the filter is located at the first position is smaller than the value of the current supplied to the second light source section when the filter is located at the second position.

10. The light source apparatus according to claim 1, further comprising:

a first optical element that is provided at a light incident side of the filter and divides the combined light that exits out of the light combiner into a first luminous flux and a second luminous flux; and a second optical element that is provided at a light exiting side of the filter and has a first light incident region on which the first luminous flux is incident and a second light incident region on which the second luminous flux is incident, wherein the filter includes a first filter section on which the first luminous flux is incident and a second filter section on which the second luminous flux is incident, when the filter is placed at the first position, the first filter section is placed at a position where the first filter section faces the first light incident region of the second optical element, and the second filter section is placed at a position where the second filter section faces the second light incident region of the second optical element, and when the filter is placed at the second position, the first filter section is placed at a position where the first filter section faces a region between the first light incident region and the second light incident region of the second optical element.

11. The light source apparatus according to claim 1, wherein the first light incident on the filter has an elliptical cross-sectional shape having a major axis and a minor axis, the third light incident on the filter has a circular cross-sectional shape, a length of a diameter of the cross-sectional shape of the third light is substantially equal to one of a length of a diameter of the cross-sectional shape of the first light in a direction along the major axis and a length of the diameter of the cross-sectional shape of the first light in a direction along the minor axis, and the filter is movable in a direction along the axis along which the two lengths are substantially equal to each other out of the direction along the major axis and the direction along the minor axis.

12. A projector comprising:

the light source apparatus according to claim 1;

a light modulator that modulates light output from the light source apparatus and containing the combined light in accordance with image information; and a projection optical apparatus that projects the light modulated by the light modulator.

\* \* \* \* \*